(12) United States Patent
Kim et al.

(10) Patent No.: US 12,513,837 B2
(45) Date of Patent: Dec. 30, 2025

(54) SLIDING MECHANISM OF DISPLAY DEVICE

(71) Applicant: LG ELECTRONICS INC., Seoul (KR)

(72) Inventors: Chanwoo Kim, Seoul (KR); Kisang Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 18/440,273

(22) Filed: Feb. 13, 2024

(65) Prior Publication Data

US 2024/0284615 A1    Aug. 22, 2024

(30) Foreign Application Priority Data

Feb. 20, 2023  (KR) .......................... 10-2023-0021968

(51) Int. Cl.
*H05K 5/02*          (2006.01)

(52) U.S. Cl.
CPC ................................ *H05K 5/0217* (2013.01)

(58) Field of Classification Search
CPC .... G06F 1/1601; G06F 1/1641; G06F 1/1652; G06F 1/1605; G06F 1/1681; G06F 1/181; G06F 1/20; G06F 1/16; G06F 1/1607; G06F 1/1624; G06F 1/1656; G06F 1/3231; G06F 9/301; H05K 5/0217; H05K 5/0226; H05K 5/0017; H05K 5/02
See application file for complete search history.

(56) References Cited

U.S. PATENT DOCUMENTS

| 9,081,540 B1 * | 7/2015 | Cho ...................... G06F 1/1601 |
| 10,290,240 B2 * | 5/2019 | Kang ....................... G09G 3/20 |

(Continued)

FOREIGN PATENT DOCUMENTS

| CN | 209373962 | 9/2019 |
| EP | 2816440 | 12/2014 |

(Continued)

OTHER PUBLICATIONS

Japan Patent Office Application No. 2024-021686, Notice of Allowance dated Apr. 15, 2025, 4 pages.

(Continued)

*Primary Examiner* — Abhishek M Rathod
(74) *Attorney, Agent, or Firm* — LEE, HONG, DEGERMAN, KANG & WAIMEY

(57) ABSTRACT

Disclosed is a display device. The display device includes: a flexible display panel; a flexible plate which is located in a rear side of the display panel, and to which the display panel is coupled; a drive module which is located in a rear side of the plate, and has a moving block that moves reciprocally on a lead screw; a sliding mount which is spaced apart from the drive module and coupled to the rear side of the plate; a slide bracket which is movably coupled to the sliding mount; a wing which extends long, has one end coupled to the moving block and the other end coupled to the slide bracket, and has a pivot shaft close to the moving block at between the moving block and the slide bracket; and a wing bracket which is connected to the pivot shaft, and fixed to the rear side of the plate, wherein the slide bracket is seesaw-connected to the wing.

14 Claims, 42 Drawing Sheets

(56) References Cited

U.S. PATENT DOCUMENTS

| | | |
|---|---|---|
| 11,805,610 B2* | 10/2023 | Pyo .......................... G09F 9/301 |
| 2014/0198465 A1 | 7/2014 | Park |
| 2014/0354519 A1 | 12/2014 | Lee et al. |
| 2014/0376163 A1* | 12/2014 | Song ........................ G09F 9/301 |
| | | 361/679.01 |
| 2015/0145837 A1 | 5/2015 | Park et al. |
| 2015/0185761 A1* | 7/2015 | Song ........................ H04N 5/64 |
| | | 361/679.21 |
| 2016/0044806 A1 | 2/2016 | Park et al. |
| 2016/0252236 A1* | 9/2016 | Chen .................... H05K 5/0217 |
| | | 362/97.1 |
| 2017/0347466 A1 | 11/2017 | Kang et al. |
| 2020/0367377 A1* | 11/2020 | Sho ........................ G06F 1/1601 |
| 2023/0397351 A1* | 12/2023 | Yoon ..................... G06F 1/1652 |
| 2025/0107018 A1* | 3/2025 | Pyo .......................... G06F 1/16 |

FOREIGN PATENT DOCUMENTS

| | | |
|---|---|---|
| EP | 3249640 | 11/2017 |
| EP | 4286984 | 12/2023 |
| JP | 2021-076838 | 5/2021 |
| KR | 10-1720178 | 3/2017 |
| WO | 2013-035212 | 3/2013 |

OTHER PUBLICATIONS

Korean Intellectual Property Office Application No. 10-2023-0021968, Office Action dated Feb. 25, 2025, 5 pages.
European Patent Office Application Serial No. 24157730.3, Search Report dated Jun. 17, 2024, 11 pages.

\* cited by examiner

SLIDING MECHANISM OF DISPLAY DEVICE

CROSS REFERENCE TO RELATED APPLICATION(S)

Pursuant to 35 U.S.C. § 119(a), this application claims the benefit of earlier filing date and right of priority to Korean Patent Application No. 10-2023-0021968, filed on Feb. 20, 2023, the contents of which are all hereby incorporated by reference herein in their entireties.

TECHNICAL FIELD

This disclosure relates to a display device, and more particularly, to a display device capable of changing the curvature of a display panel.

BACKGROUND

As the information society develops, the demand for display devices is also increasing in various forms. In response to this, in recent years, various display devices such as Liquid Crystal Display Device (LCD), Electro luminescent Display (ELD), Vacuum Fluorescent Display (VFD), and Organic Light Emitting Diode (OLED) have been researched and used.

Among them, an OLED panel can display an image by depositing an organic material layer that can emit light by itself on a substrate on which a transparent electrode is formed. The OLED panel may have flexible characteristics as well as a thin thickness. Much research has been conducted on the structural characteristics of display devices equipped with such an OLED panel.

SUMMARY

The disclosure has been made in view of the above problems, and may provide a structure that can freely change the curvature of a display panel.

The disclosure may further provide a mechanism to freely change the curvature of a display.

The disclosure may further provide an articulated structure for a mechanism that can freely change the curvature of a display panel.

The disclosure may improve the durability and noise of a display device capable of changing the curvature of a display panel.

The disclosure may provide a mechanism to change a display panel to a certain curvature and restore it to flat.

In accordance with an aspect of the present invention, a display device includes: a flexible display panel; a flexible plate which is located in a rear side of the display panel, and to which the display panel is coupled; a drive module which is located in a rear side of the plate, and has a moving block that moves reciprocally on a lead screw; a sliding mount which is spaced apart from the drive module and coupled to the rear side of the plate; a slide bracket which is movably coupled to the sliding mount; a wing which extends long, has one end coupled to the moving block and the other end coupled to the slide bracket, and has a pivot shaft close to the moving block at between the moving block and the slide bracket; and a wing bracket which is connected to the pivot shaft, and fixed to the rear side of the plate, wherein the slide bracket is seesaw-connected to the wing.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Figure 1:
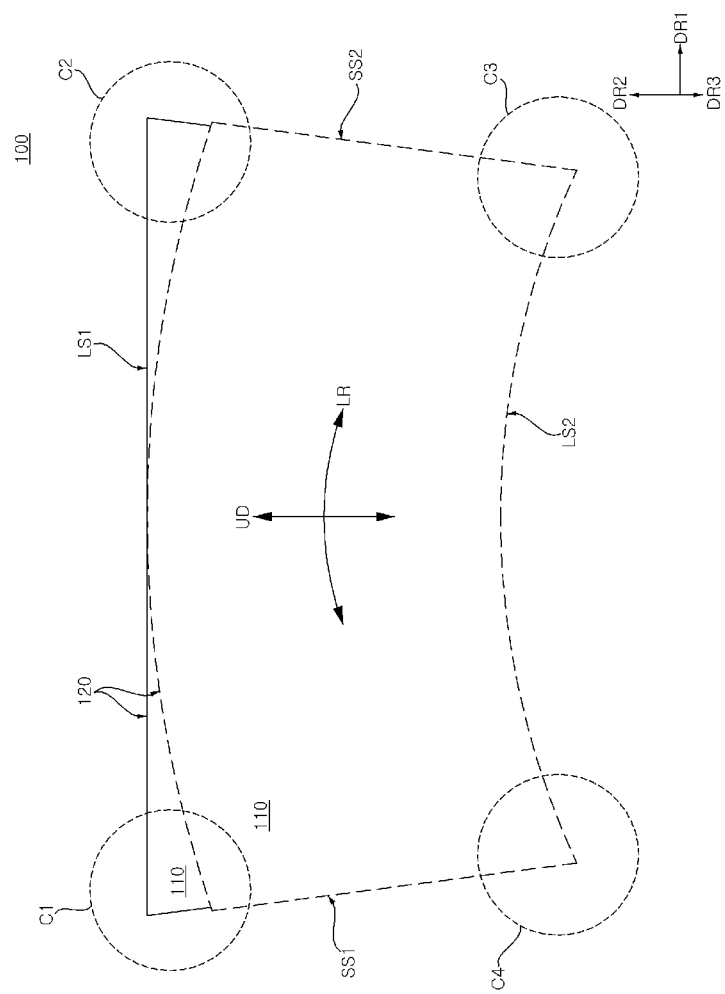
FIGS. 1 to 42 are diagrams showing examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Hereinafter, a liquid crystal panel (LCD) will be described as an example for a display panel, but the display panel applicable to the present disclosure is not limited to the liquid crystal panel.

In addition, hereinafter, a display device may include a first long side LS1, a second long side LS2 facing the first long side LS1, a first short side SS1 adjacent to one end of the first long side LS1 and the second long side LS2, and a second short side SS2 facing the first short side SS1.

Here, the first short side area SS1 may be referred to as a first side area, the second short side area SS2 may be referred to as a second side area facing the first side area, the first long side area LS1 may be referred to as a third side area which is adjacent to the first side area and the second side area and located between the first side area and the second side area, and the second long side area LS2 may be referred to as a fourth side area which is adjacent to the first side area and the second side area, located between the first side area and the second side area, and faces the third side area.

In addition, for convenience of explanation, it is illustrated that the lengths of the first and second long sides LS1 and LS2 are longer than the lengths of the first and second short sides SS1 and SS2, but it may be possible that the lengths of the first and second long sides LS1 and LS2 are approximately the same as the lengths of the first and second short sides SS1 and SS2.

In addition, hereinafter, a first direction DR1 may be a direction parallel to the long side LS1, LS2 of a display panel 100, and a second direction DR2 may be a direction parallel to the short side SS1, SS2 of the display panel 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A side on which a display device displays an image may be referred to as a front side or front surface. When a display device displays an image, the side from which an image cannot be observed may be referred to as a rearward direction or a rear side or rear surface. When the display is viewed from a forward direction or the front side, the side of the first long side LS1 may be referred to as an upper side or an upper surface. Similarly, the side of the second long side LS2 may be referred to as a lower side or a lower surface. Similarly, the side of the first short side SS1 may be referred to as a left side or a left surface, and the side of the second short side SS2 may be referred to as a right side or a right surface.

In addition, the first long side LS1, the second long side LS2, the first short side SS1, and the second short side SS2 may be referred to as an edge of the display device. In addition, a point where the first long side LS1, the second long side LS2, the first short side SS1, and the second short side SS2 meet each other may be referred to as a corner. For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Here, a direction from the first short side SS1 toward the second short side SS2 or a direction from the second short side SS2 toward the first short side SS1 may be referred to as a left-right direction LR. A direction from the first long side LS1 toward the second long side LS2 or a direction from the second long side LS2 toward the first long side LS1 may be referred to as a up-down direction UD.

Referring to FIG. 1, a display panel 110 may be coupled to a plate 120. The plate 120 may be flexible. The plate 120 may be referred to as a flexible plate 120, a frame 120, or a module cover. The display panel 110 may be located in the front side of or in the front surface of the plate 120. The display panel 110 may be flexible. For example, the display panel 110 may be an OLED panel.

The display panel 110 is provided on the front surface of the display device 100 and may display images. The display panel 110 may divide an image into a plurality of pixels and output an image with color, brightness, and saturation for each pixel. The display panel 110 may generate light corresponding to a color of red, green, or blue in response to a control signal.

The display device 100 may have variable curvature. The left and right sides of the display device 100 may move in a forward direction. For example, when viewing an image from the front side of the display device 100, the display device 100 may be concavely curved. At this time, the plate 120 may be bent in the same curvature as the display panel 110. Alternatively, the display panel 110 may be curved to correspond to the curvature of the plate 120.

Figure 2:
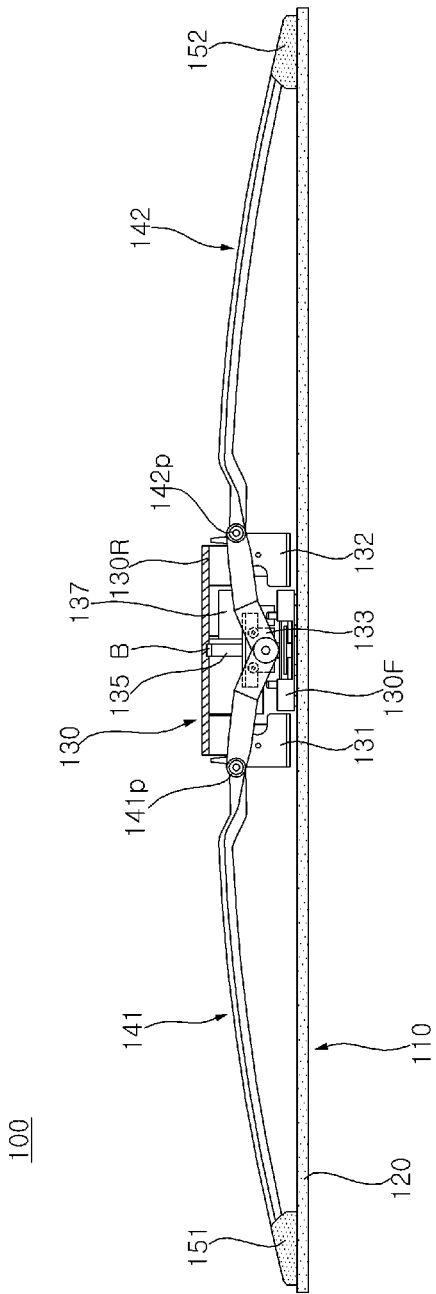
Figure 3:
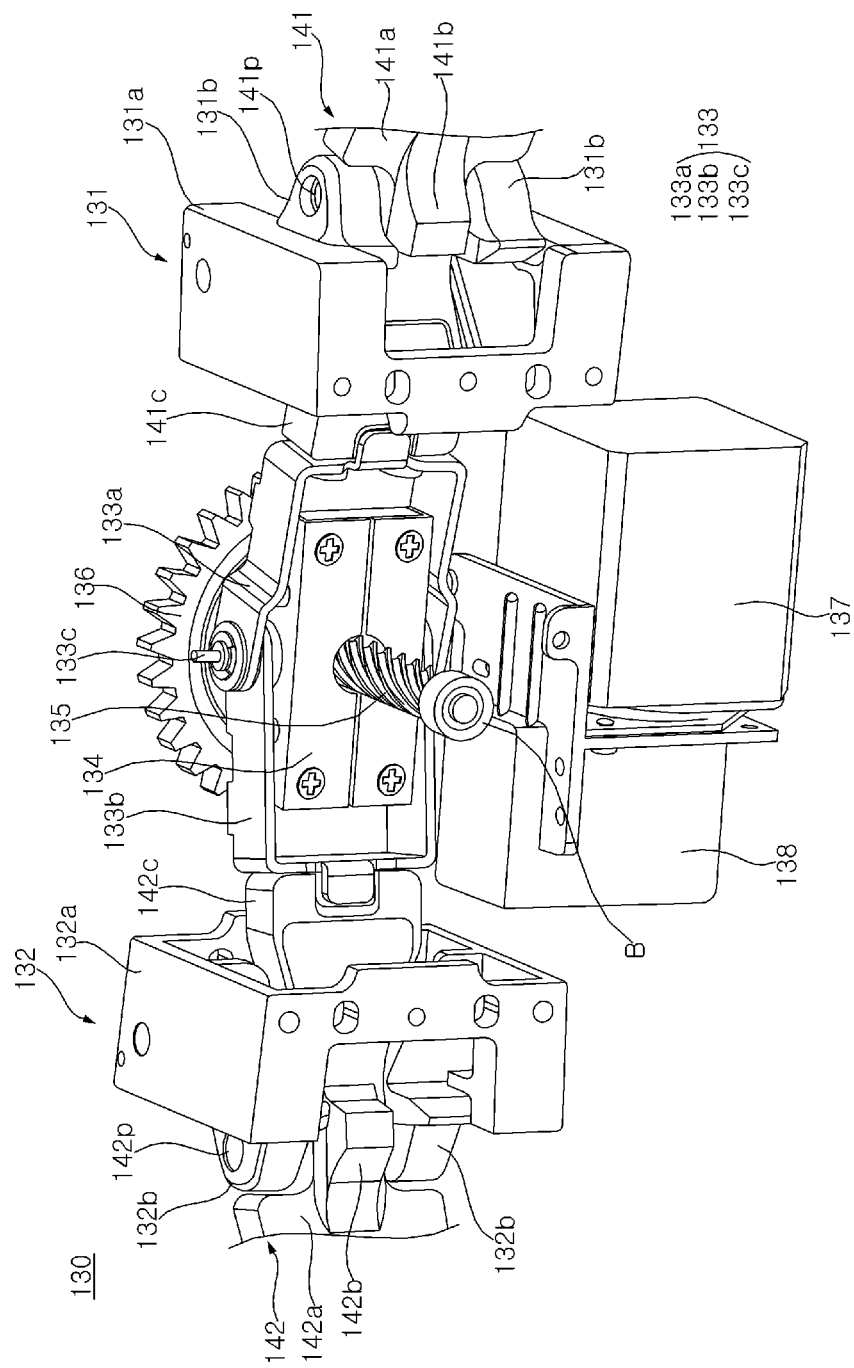

Referring to FIGS. 2 and 3, the plate 120 may be coupled to the rear side of the display panel 110. The plate 120 may support the display panel 110 from the rear side of the display panel 110. The plate 120 may have a shape corresponding to the display panel 110.

A drive module 130 may be coupled to the rear side of the plate 120. A front bracket 130F, a rear bracket 130R, and a wing bracket 131, 132 may be located in the rear side of the plate 120. The front bracket 130F may be coupled or fixed to the rear surface of the plate 120. The rear bracket 130R may be located in the rear side of the front bracket 130F, be spaced apart from the front bracket 130F, and face the front bracket 130F.

The wing bracket 131, 132 may include a bracket frame 131a, 132a, and a wing holder 131b, 132b. The bracket frame 131a, 132a may have a square box shape. The wing holder 131b, 132b may be formed in one side of the bracket frame 131a, 132a. The wing holder 131b, 132b may protrude from one surface of the bracket frame 131a, 132a. The wing holder 131b, 132b may be a pair. A pair of wing holder 131b, 132b may face each other.

There may be a plurality of wing brackets 131 and 132. The plurality of wing brackets 131 and 132 may include a first wing bracket 131 and a second wing bracket 132. The first wing bracket 131 may be coupled or fixed to the front bracket 130F and/or the rear bracket 130R, and may face the second wing bracket 132 with respect to the front bracket 130F. The second wing bracket 132 may also be coupled or fixed to the front bracket 130F and/or the rear bracket 130R.

A wing 141, 142 may include a blade 141a, 142a, a neck 141b, 142b, and a lever 141c, 142c. For example, the wing 141, 142 may be metal. For another example, the wing 141, 142 may be an aluminum alloy. The blade 141a, 142a may be an elongated plate, and may be provided with a rib to ensure rigidity. The lever 141c, 142c and the neck 141b, 142b may be formed in one end of the blade 141a, 142a. The neck 141b, 142b may connect the lever 141c, 142c and the blade 141a, 142a at between the lever 141c, 142c and the blade 141a, 142a. The width of the neck 141b, 142b may be smaller than the width of the lever 141c, 142c, and the width of the lever 141c, 142c may be smaller than the width of the blade 141a, 142a. A pivot shaft 141p, 142p may be formed in the neck 141b, 142b. The pivot shaft 141p, 142p may be inserted into the wing holder 131b, 132b. The wing 141, 142 may pivot around the pivot shaft 141p, 142p and the wing holder 131b, 132b.

The first wing 141 may be rotatably or pivotably coupled to the first wing bracket 131, and the second wing 142 may be rotatably or pivotably coupled to the second wing bracket 132. The first wing 141 may be symmetrical with the second wing 142 with respect to the drive unit 130.

A sliding mount 151, 152 may be coupled or fixed to the rear side or rear surface of the plate 120. A first sliding mount 151 may be located adjacent to the left side of the plate 120, and a second sliding mount 152 may be located adjacent to the right side of the plate 120. The distal end of the first wing 141 may be movably coupled to the first sliding mount 151. The distal end of the second wing 142 may be movably coupled to the second sliding mount 152.

A flip frame 133 may be located between the lever 141c of the first wing 141 and the lever 142c of the second wing 142, and may be coupled to the levers 141c and 142c. For example, the flip frame 133 may be metal. The flip frame 133 may include a first frame 133a and a second frame 133b. For example, the first frame 133a may be U-shaped, and the second frame 133b may be U-shaped. The first frame 133a may be pivotally connected to the second frame 133b. A pivot pin 133c may penetrate the first frame 133a and the second frame 133b to connect the first frame 133a and the second frame 133b. The first frame 133a may pivot with respect to the second frame 133b, and the second frame 133b may pivot with respect to the first frame 133a. The first frame 133a may be fixed to or coupled to the lever 141c of the first wing 141, and the second frame 133b may be fixed to or coupled to the lever 142c of the second wing 142.

A moving block 134 may be located inside the flip frame 133. The moving block 134 may be located between the first frame 133a and the second frame 133b of the flip frame 133.

A lead screw 135 may be inserted into the moving block 134. The moving block 134 may move on the lead screw 135 according to the rotation of the lead screw 135. When the lead screw 135 is rotated and reversely rotated, the moving block 134 may reciprocate on the lead screw 135.

The lead screw 135 may be coupled to a drive gear 136, and may rotate together with the drive gear 136. The drive gear 136 may rotate while facing the rear surface of the plate 120 (see FIG. 2). The lead screw 135 may be the rotation axis of the drive gear 136. The bearing B may be coupled to one end and/or both ends of the lead screw 135. One end of the lead screw 135 may be inserted into the front bearing B and rotate, and the other end of the lead screw 135 may be inserted into the rear bearing B and rotate. For example, the lead screw 135 may be press-fitted into the front bearing B and the rear bearing B.

A motor 137 may be located below the moving block 134. The motor 137 may provide rotational power. A gearbox 138 may transmit the rotational force of the motor 137 to the drive gear 136.

Figure 4:
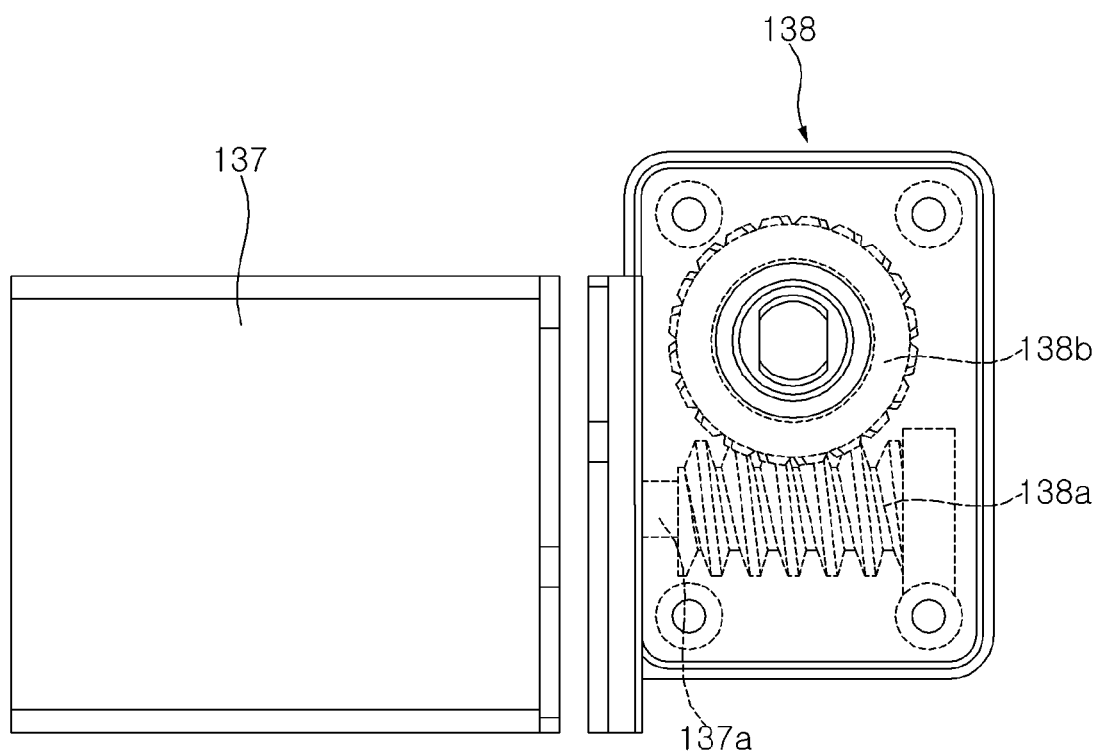
Figure 5:
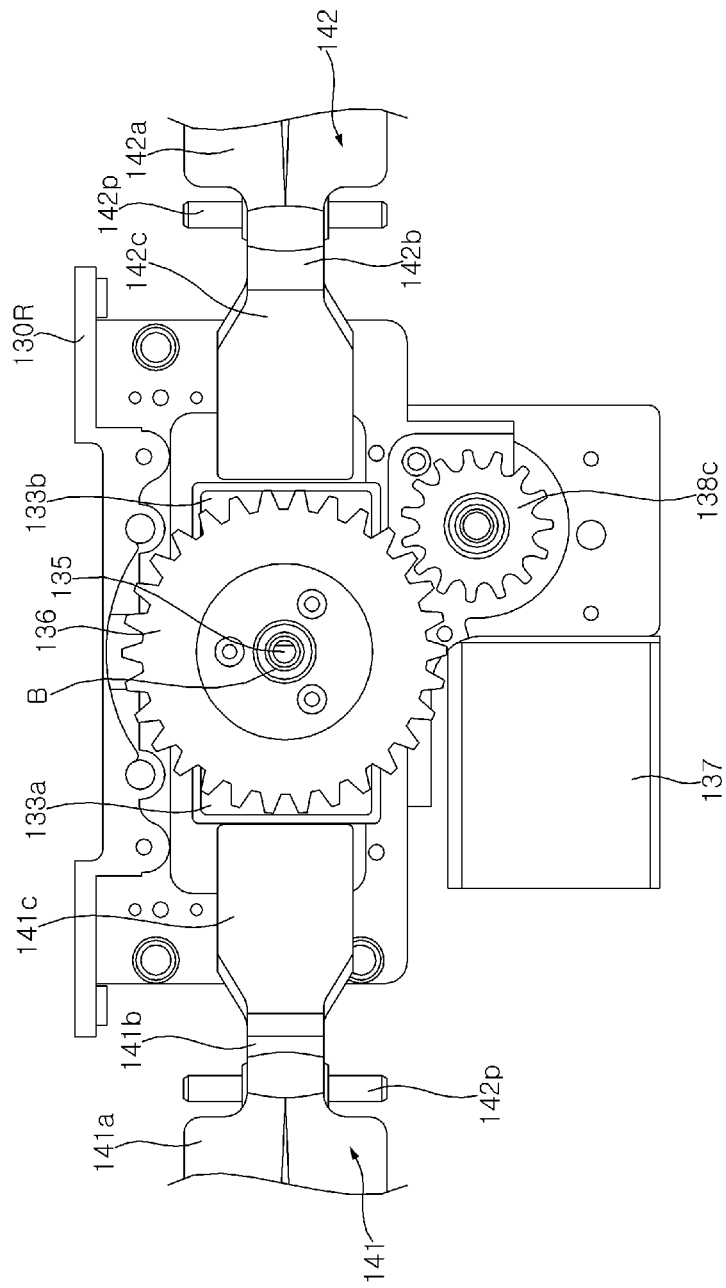

Referring to FIGS. 4 and 5, the first gear 138a may be fixed to the rotation shaft 137a of the motor 137 and may rotate together with the rotation shaft 137a of the motor 137. For example, the first gear 138a may be a worm gear. The second gear 138b may be meshed with the first gear 138a. For example, the second gear 138b may be a worm gear.

The first gear 138a and the second gear 138b may be located inside the gear box 138. A transmission gear 138c may be located outside the gear box 138. The transmission gear 138c may be fixed to the rotation shaft 137a of the second gear 138b, and may rotate together with the second gear 138b. The transmission gear 138c may be engaged with the drive gear 136.

The lead screw 135 may be the rotation axis of the drive gear 136. The drive gear 136 may be fixed to the lead screw 135. The drive gear 136 may be pin-coupled to the lead screw 135.

Figure 6:
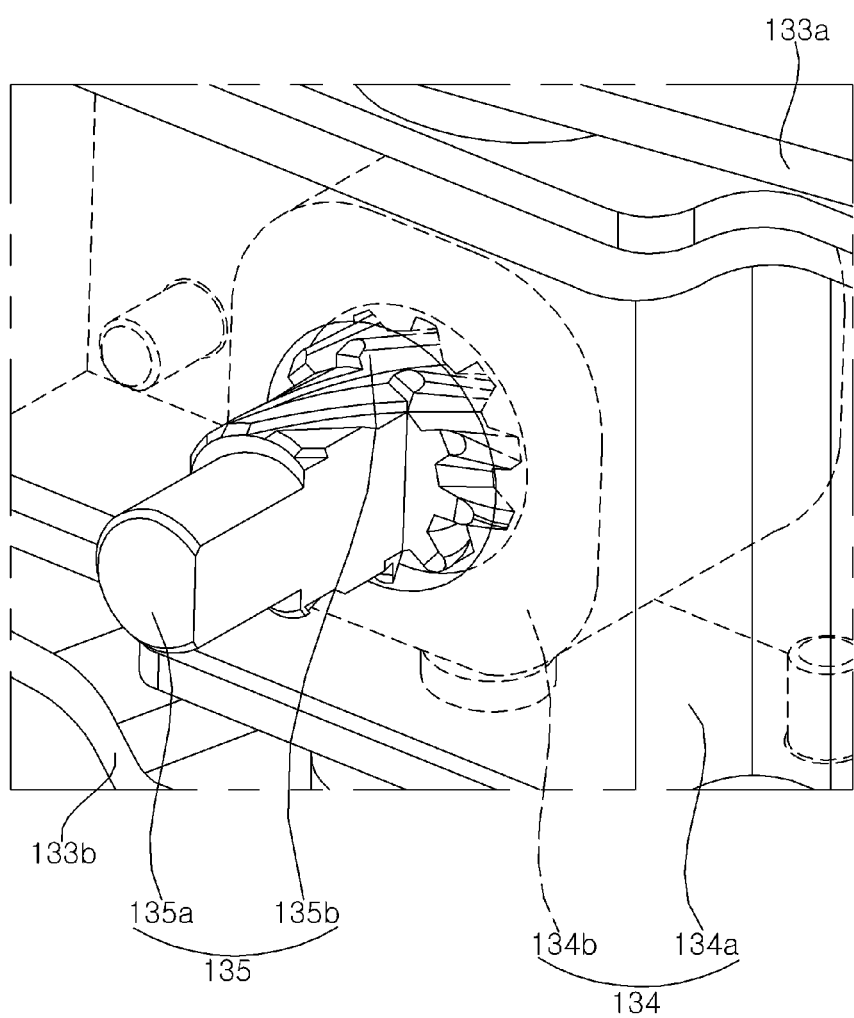

Referring to FIG. 6, the lead screw 135 may include a shaft body 135a and a screw 135b. The shaft body 135a may be an elongated cylinder, and the screw 135b may be formed on the outer circumferential surface of the shaft body 135a. The moving block 134 may include a moving body 134a and a sliding block 134b. For example, the moving body 134a may be metal, and the sliding block 134b may be made of synthetic resin. The sliding block 134b may be located inside the moving body 134a. The sliding block 134b may be screw-coupled to the lead screw 135.

The lead screw 135 may be inserted into the sliding block 134b. As the lead screw 135 rotates, the sliding block 134b may move on the lead screw 135. A gap may be formed between the inner circumferential surface of the sliding block 134b and the screw 135b of the lead screws 135.

Accordingly, the moving block 134 may be prevented from being caught while moving on the lead screw 135 or from being locked during movement.

Figure 7:
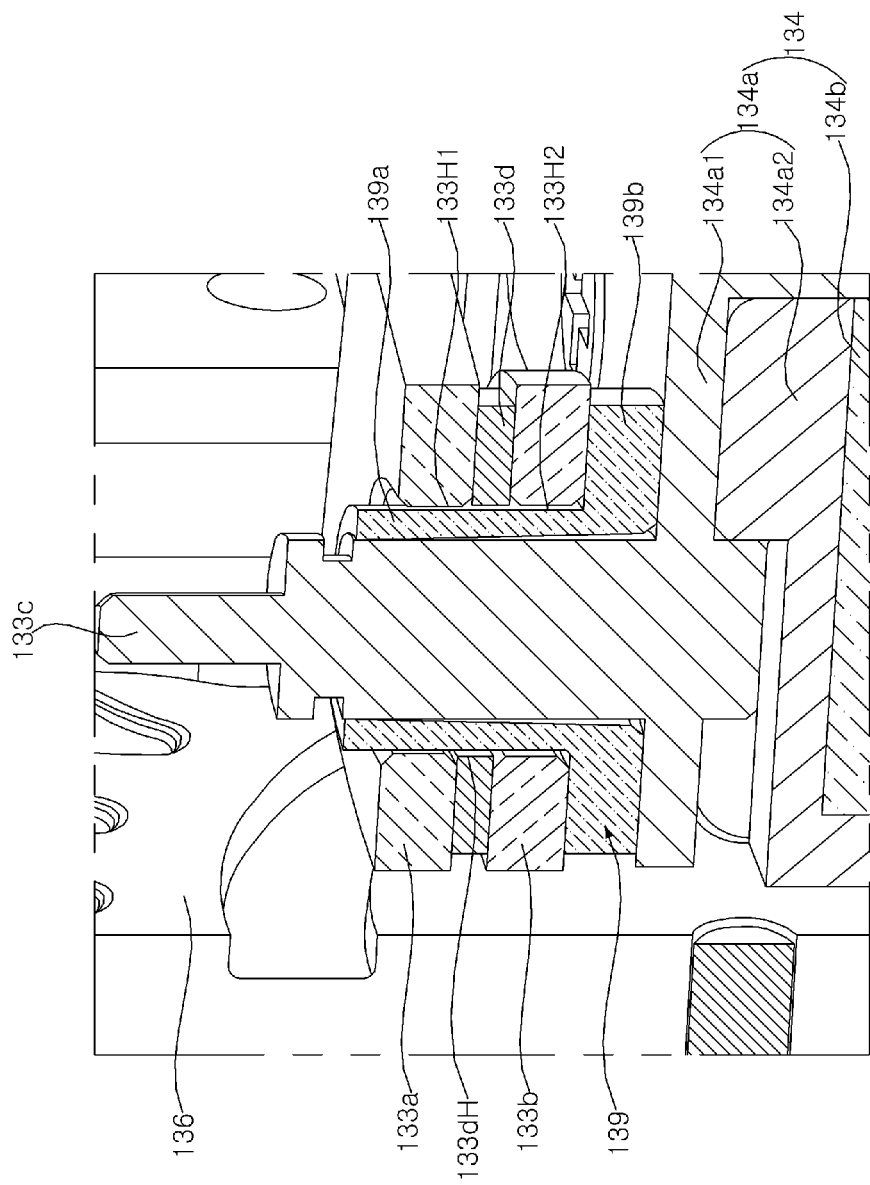

Referring to FIG. 7, the moving body 134a may include an outer part 134a1 and an inner part 134a2. The outer part 134a1 may form the outer surface of the moving body 134a. The inner part 134a2 may be coupled to the inside of the outer part 134a1. For example, the outer part 134a1 may be a U-shaped metal plate, and the inner part 134a2 may be a metal shell having an internal accommodating space. The sliding block 134b may be coupled to the inside of the inner part 134a2.

The pivot pin 133c may protrude and extend from the outer part 134a1 of the moving body 134a. The first frame 133a and second frame 133b of the flip frame 133 may include hole 133H1, 133H2. The pivot pin 133c may be inserted into the hole 133H2 of the second frame 133b and the hole 133H1 of the first frame 133a. A disk 133d may be located between the first frame 133a and the second frame 133b, and the pivot pin 133c may be inserted into the disk 133d hole 133dH. For example, the disk 133d may be formed of a material having high durability and low friction.

An intermediate member 139 may be located between the moving body 134a and the pivot pin 133c and the flip frame 133. The intermediate member 139 may cover the upper surface of the moving body 134a and the outer surface of the pivot pin 133c. The intermediate member 139 may be referred to as a low friction member 139 or a lubricating member 139. In addition, the intermediate member 139 may be referred to as a skin member 139.

The intermediate member 139 may include a body portion 139a and a flange portion 139b. The body portion 139a may have a cylindrical shape. The pivot pin 133c may be inserted into the body portion 139a. The body portion 139a may contact the outer surface of the pivot pin 133c, and the flange portion 139b may contact the upper surface of the moving body 134a. The intermediate member 139 may be a low friction synthetic resin. The intermediate member 139 may be a low friction material. For example, the intermediate member 139 may be a POM acetal homopolymer material. The first frame 133a and second frame 133b of the flip frame 133 may contact or produce friction with the intermediate member 139 and move around the pivot pin 133c.

The intermediate member 139 may fill the gap between the hole 133H1 of the first frame 133a of the flip frame 133 and the pivot pin 133c. The intermediate member 139 may fill the gap between the hole 133H2 of the second frame 133b of the flip frame 133 and the pivot pin 133c. The second frame 133b of the flip frame 133 can be placed on the intermediate member 139. Accordingly, the pivot pin 133c may transmit force to the flip frame 133 without noise or vibration.

Figure 8:
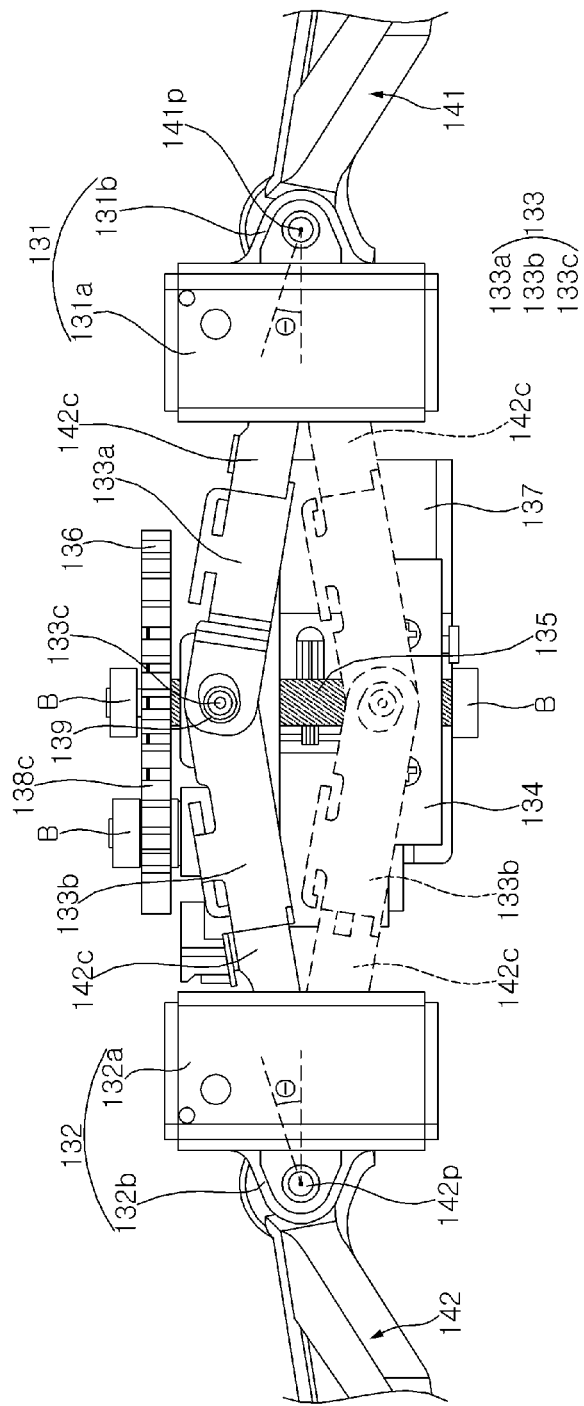
Figure 9:
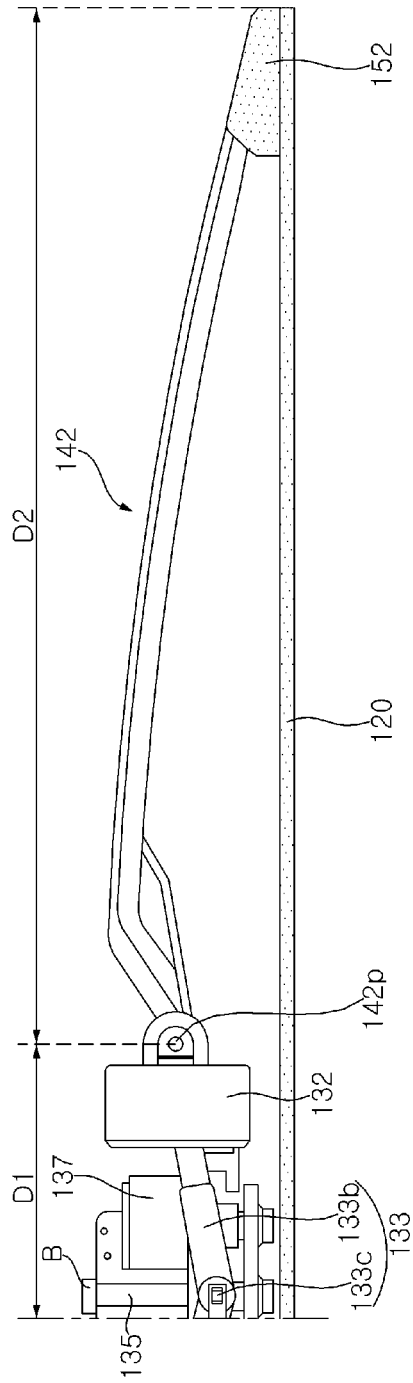

Referring to FIGS. 8 and 9, when the lead screw 135 rotates, the moving block 134 and the flip frame 133 may move on the lead screw 135. The flip frame 133 may perform a reciprocating movement in the longitudinal direction of the lead screw 135.

The movement of the flip frame 133 may pivot the first wing 141 and/or the second wing 142 around pivot shafts 141P and 142P.

A first distance D1 from the pivot pin 133c to the pivot shaft 141P, 142P may be smaller than a second distance D2 from the pivot shaft 141P, 142P to the sliding mount 151, 152. For example, the first distance D1 may be ¼ of the second distance D1.

The lever 141c, 142c of the wing 141, 142 may be fixed to the flip frame 133, and the flip frame 133 moves with the pivot pin 133c as it moves, so that the driving force of the moving block 134 moving on the lead screw 135 can be efficiently transmitted to the lever 141c, 142c of the wing 141,142 through the flip frame 133.

In addition, the lever 141c, 142c of the wing 141, 142 may be fixed to the flip frame 133 and move together to increase the first distance D1, thereby allowing the wing 141, 142 to be driven with a small force. Accordingly, the power transmission efficiency of the drive unit 130 increases and the power consumption of the motor 137 can be reduced.

Figure 10:
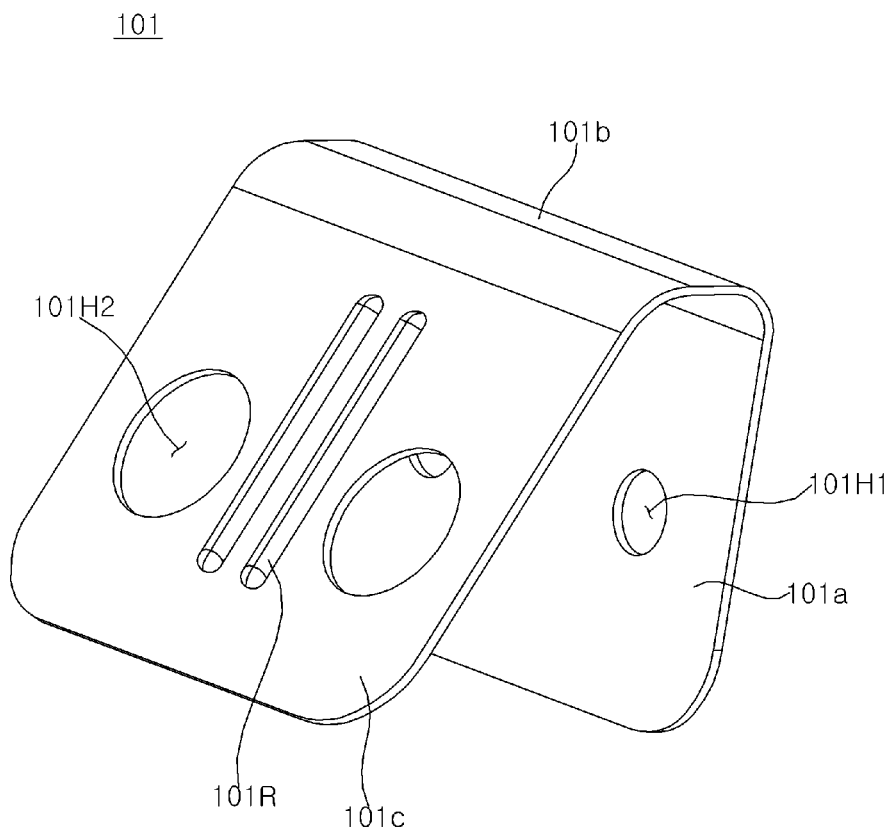
Figure 11:
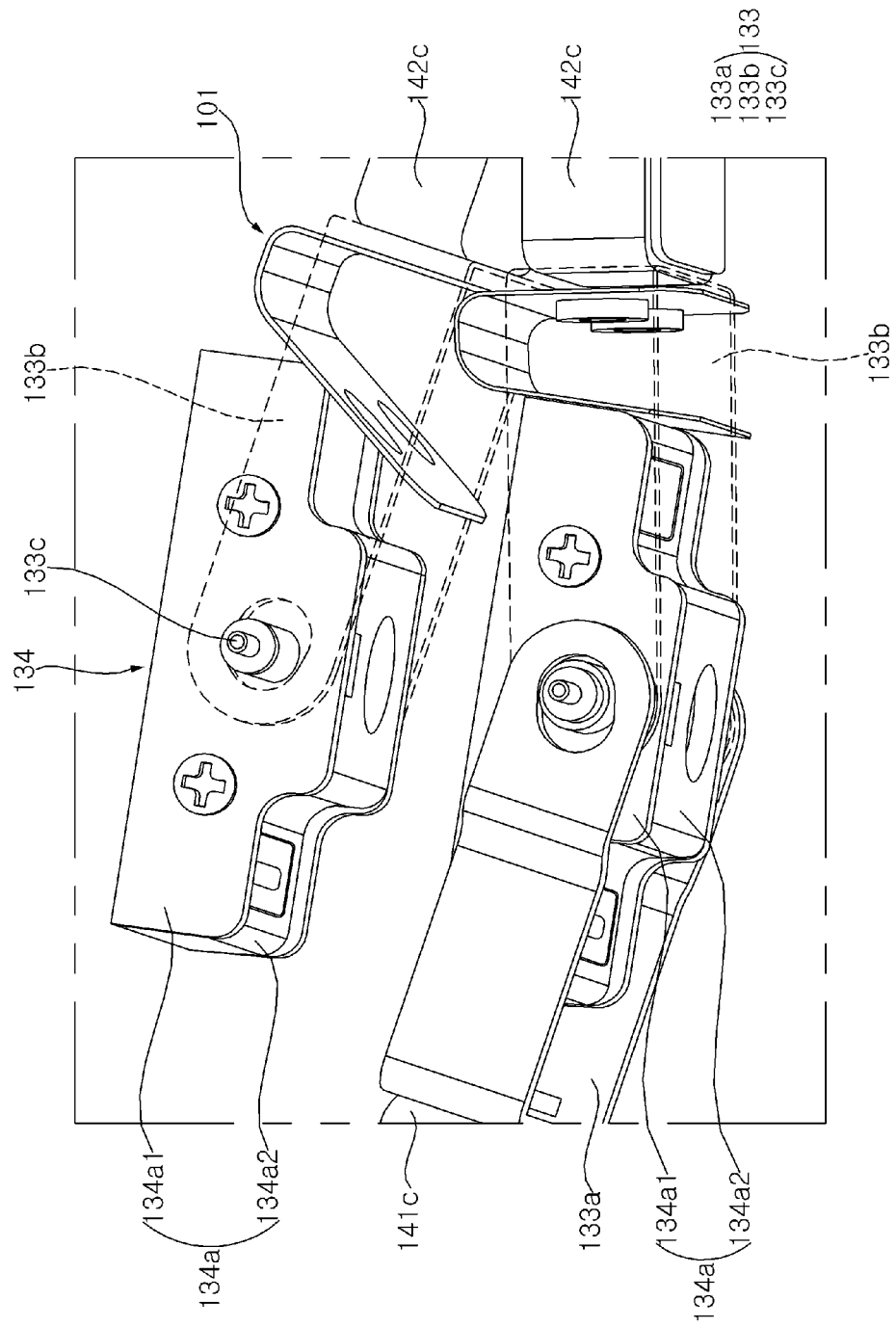

Referring to FIGS. 10 and 11, an elastic member 101 may include a first part 101a, a second part 101b, and a third part 101c. The elastic member 101 may be referred to as a first elastic member 101 or a clip 101. The first part 101a may be a plate. The second part 101b may be bent and extended from the first part 101a. The third part 101c may be bent and extend from the second part 101b. The third part 101c may face the first part 101a. A second angle formed by the second part 101b and the third part 101c may be larger than a first angle formed by the first part 101a and the second part 101b. In the extending direction, the length of the third part 101c may be larger than the length of the first part 101a. The elastic member 101 may be a metal plate, and may have elasticity. For example, the elastic member 101 may be a leaf spring.

A coupling hole 101H1 may be formed in the first part 101a. There may be a plurality of coupling holes 101H1. A support rib 101R may be formed in the third part 101c. The support ribs 101R may extend in the extending direction of the third part 101c. There may be a plurality of support ribs 101R. The support ribs 101R may protrude from the outer surface of the third part 101c. The plurality of support ribs 101R may be parallel to each other.

The elastic member 101 may be inserted between the moving block 134 and the lever 141c, 142c of the wing 141, 142. The first part 101a of the elastic member 101 may be fixed to the lever 141c, 142c of the wing 141, 142. For example, the first part 101a of the elastic member 101 may be fastened to the lever 141c, 142c of the wing 141, 142 by screw. The third part 101c of the elastic member 101 may support the moving block 134. The third part 101c of the elastic member 101 may be in contact with the side surface of the moving block 134. The third part 101c of the elastic member 101 may be in contact with the outer part 134a1 and/or the inner part 134a2 of the moving body 134a. The outer part 134a1 and/or inner part 134a2 of the moving body 134a in contact with the third part 101c of the elastic member 101 may be rounded. The support rib 101R formed in the third part 101c of the elastic member 101 may contact the inner part 134a2 of the moving block 134.

There may be a plurality of elastic members 101. Each of the plurality of elastic members 101 may be inserted into between the moving block 134 and the lever 141c of the first wing 141 and into between the moving block 134 and the lever 142c of the second wing 142.

In the mechanism in which the flip frame 133 flips or pivots around the pivot pin 133c, a gap may occur between the pivot pin 133c of the moving block 134 and the hole 133H1, 133H2 (see FIG. 7) of the flip frame 133. The elastic member 101 may push the moving block 134 in one direction. The elastic member 101 may push the moving block 134 in one direction so that the pivot pin 133c of the moving block 134 may be in close contact with one side of the hole 133H1, 133H2 of the flip frame 133.

Accordingly, force may be transmitted to the flip frame 133 in all sections where the moving block 134 moves on the lead screw 135. In the mechanism by which the moving block 134 transmits force to the flip frame 133, a gap between components may cause the bending of the display panel 110 to temporarily stop. According to the present embodiment, the bending of the display panel 110 can be implemented continuously.

Figure 12:
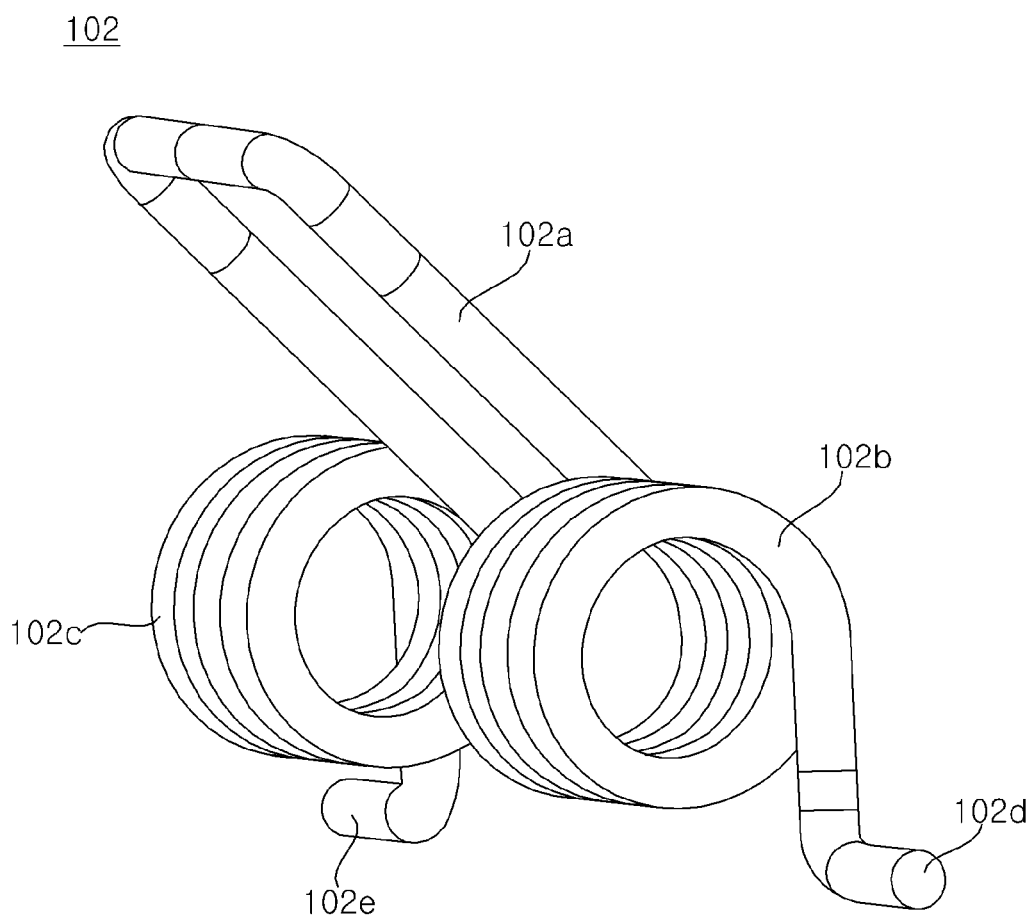
Figure 13:
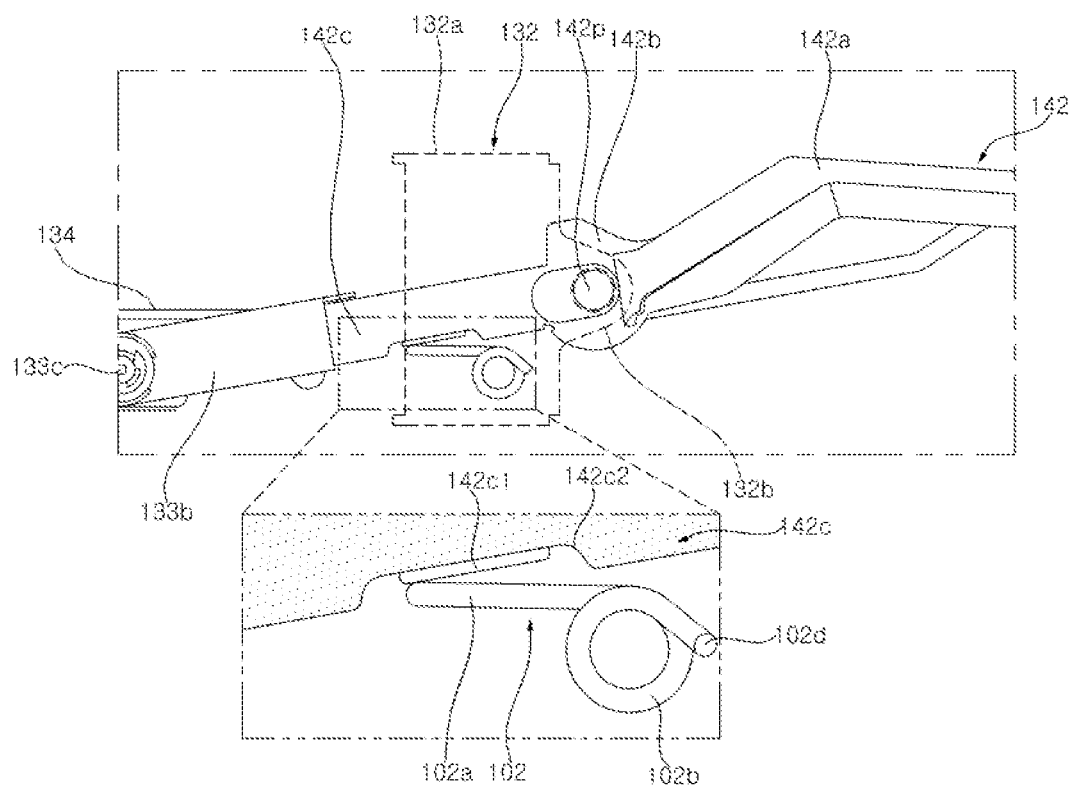

Referring to FIGS. 12 and 13, the elastic member 102 may include a lever portion 102a, a support portion 102d, 102e, and a coil portion 102b, 102c. The elastic member 102 may be formed of wire. The elastic member 102 may be referred to as a second elastic member 102.

The lever portion 102a may be a wire bent in a U shape. The coil portion 102b, 102c may be connected to the lever portion 102a. There may be a plurality of coil portions 102b and 102c. A first coil portion 102b may be connected to one end of the lever portion 102a, and a second coil portion 102c may be connected to the other end of the lever portion 102a. There may be a plurality of support portions 102d and 102e. A first support part 102d may form the distal end of the first coil portion 102b, and a second support part 102e may form the end of the second coil portion 102c.

When the support portion 102d, 102e is fixed, the lever portion 102a may rotate or pivot around the coil portion 102b, 102c. The coil portion 102b, 102c may provide elastic force to the lever portion 102a.

The elastic member 102 may be installed in the wing bracket 132. The support portion 102d, 102e of the elastic member 102 may be fixed to the bracket frame 132a of the wing bracket 132. The lever portion 102a of the elastic member 102 may be supported on the lever 142c of the wing 142.

The wing 142 may include a support groove 142c2 and a friction pad 142c1. The support groove 142c2 may be formed at a position corresponding to a portion of the length of the lever portion 102a of the elastic member 102. The friction pad 142c1 may be formed in the support groove 142c2. The friction pad 142c1 may be formed to protrude from the support groove 142c2, and its surface may be smoothly polished.

When the wing 141, 142 are pivotably coupled to the wing bracket 131, 132, a gap may be formed between the pivot shaft 141p, 142p of the wing 141, 142 and the wing holder 131b, 132b of the wing bracket 131, 132. In a mechanism in which the moving block 134 transmits force to the flip frame 133 to allow the wing 141,142 to bend the display panel 110, a gap between components may allow the bending of the display panel 110 to temporarily stop. The wing 141,142 may receive force from the elastic member 102 toward the front side of the display device 100. Accordingly, bending of the display panel 110 may be implemented continuously. Furthermore, the power consumption of the motor 137 for bending the display panel 110 may be reduced.

In addition, by screwing the sliding block 134b (see FIG. 6) and the lead screw 135, a gap may be formed for the sliding block 134b to move on the lead screw 135. The elastic member 102 may push the wing 141, 142 to bring the sliding block 134b into close contact with the lead screw 135 in one direction, bending of the display panel 110 can be implemented continuously. In addition, in a state where the display panel 110 is flat, when the rotational force of the motor 137 and the lead screw 135 is released, the flatness of the display panel 110 may change. According to this embodiment, the display panel 110 may be maintained in a flat state and/or the display panel 110 may be maintained to be curved with a certain curvature.

Figure 14:
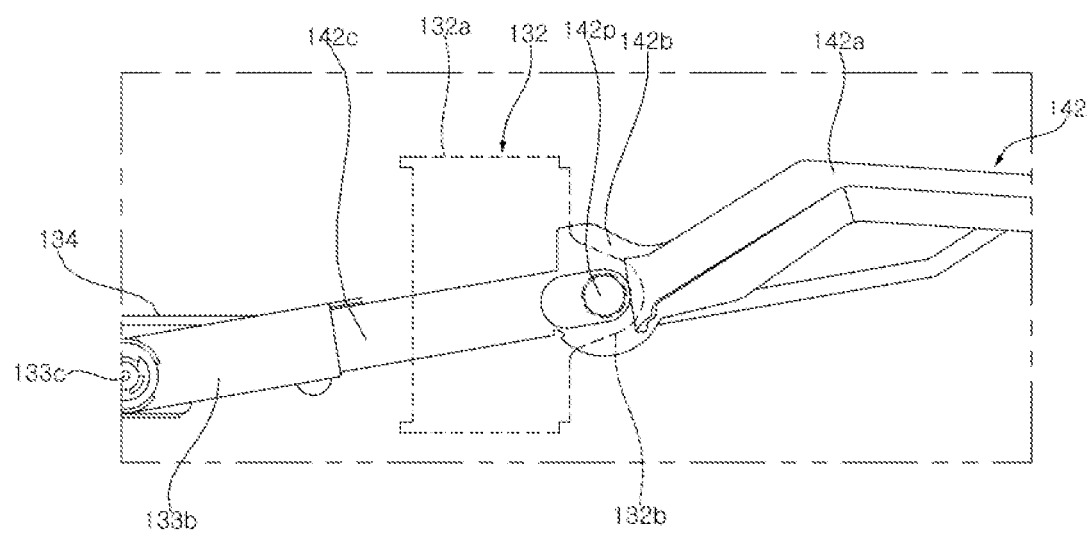
Figure 15:
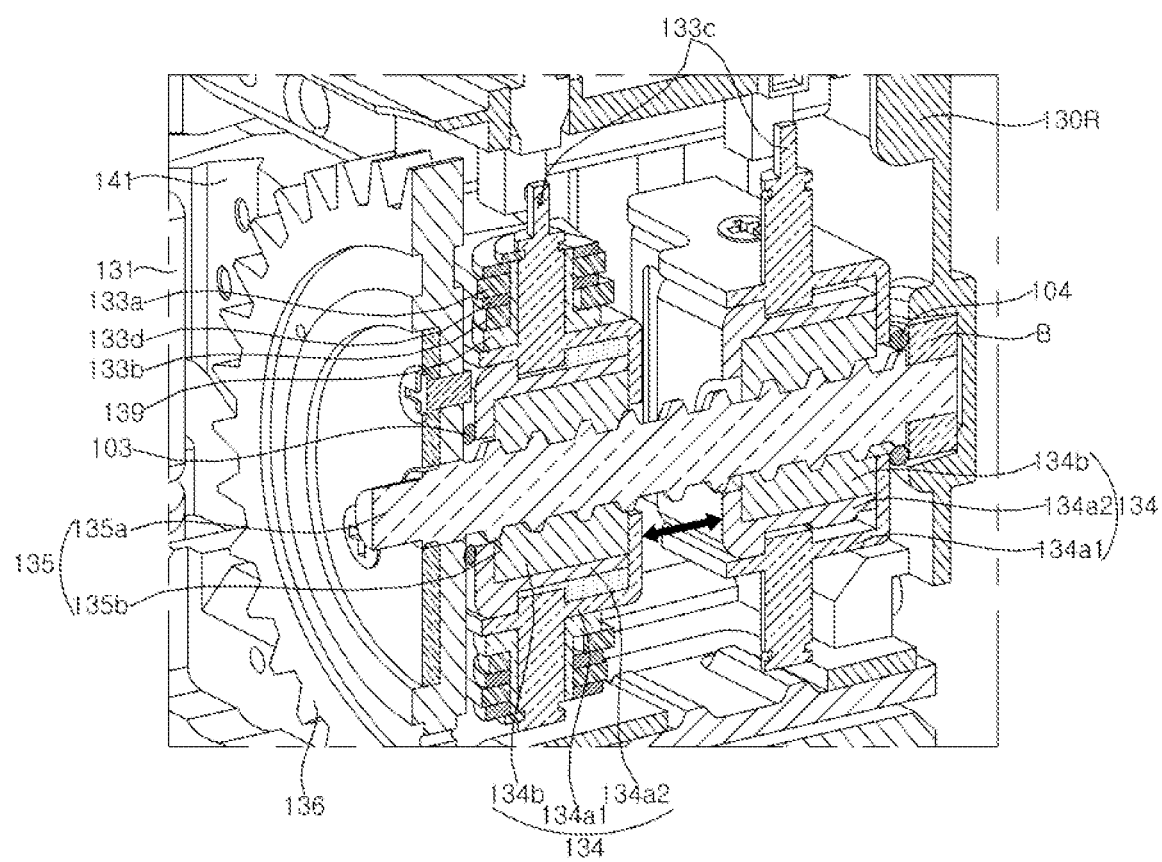

Referring to FIGS. 14 and 15 together with FIG. 8, when the wing 141, 142 is pivotably coupled to the wing bracket 131, 132, a gap may be formed between the pivot shaft 141p, 142p of the wing 141, 142 and the wing holder 131b, 132b of the wing bracket 131, 132.

In the mechanism where the moving block 134 transmits force to the flip frame 133 to allow the wing 141, 142 to bend the display panel 110, a gap between the components may allow the bending of the display panel 110 to temporarily stop.

An elastic ring 103, 104 may be located to surround the outer circumference of the lead screw 135. The lead screw 135 may be inserted into the elastic rings 103, 104. The elastic ring 103, 104 may be referred to as a compression ring 103, 104 or a compression member 103, 104. For example, the elastic ring 103, 104 may be high-elasticity rubber. The diameter of the elastic ring 103, 104 may be larger than the diameter of the shaft body 135a of the lead screw 135. For example, the inner diameter of the elastic ring 103, 104 may be larger than the outer diameter of the shaft body 135a of the lead screw 135. There may be a plurality of elastic rings 103 and 104. The plurality of elastic rings 103 and 104 may include a first elastic ring 103 and a second elastic ring 104. The first elastic ring 103 may be referred to as a front elastic ring 103, and the second elastic ring 104 may be referred to as a rear elastic ring 104.

The front elastic ring 103 may be located between the drive gear 136 and the moving block 134. The front elastic ring 103 may be in contact with the drive gear 136. As the moving block 134 moves on the lead screw 135, the front elastic ring 103 may contact or be spaced apart from the inner part 134a2 of the moving block 134. As the moving block 134 approaches the drive gear 136, the front elastic ring 103 may be compressed. In addition, when the moving block 134 moves away from the drive gear 136, the front elastic ring 103 may push the moving block 134.

The rear elastic ring 104 may be located between the bearing B and the moving block 134. The rear elastic ring 104 may be in contact with the bearing B. As the moving block 134 moves on the lead screw 135, the rear elastic ring 104 may be in contact with or spaced apart from the outer part 134a1 of the moving block 134. As the moving block 134 approaches the bearing B, the moving block 134 may compress the rear elastic ring 104. In addition, as the moving block 134 moves away from the bearing B, the rear elastic ring 104 may push the moving block 134.

Accordingly, the bending of the display panel 110 may be implemented continuously. In addition, a lot of power consumption may be required in the initial operation to bend or flatten the display panel 110. Upon initial operation of the moving block 134, the elastic ring 103, 104 may push the moving block 134 to reduce the power consumption of the motor 137 for bending the display panel 110.

In addition, by screwing the sliding block 134b (see FIG. 6) and the lead screw 135, a gap for the sliding block 134b to move on the lead screw 135 may be formed. The moving block 134 may compress the elastic ring 103, 104 or the elastic ring 103, 104 may push the moving block 134 so that the sliding block 134b is in close contact with the lead screw 135 in the longitudinal direction of the lead screw 135, and the bending of display panel 110 can be implemented continuously.

In addition, in a state where the display panel 110 is flat, when the rotational force of the motor 137 and the lead screw 135 is released, the flatness of the display panel 110 may change. According to this embodiment, the display panel 110 may be maintained in a flat state and/or the display panel 110 may be maintained to be curved at a certain curvature.

Figure 16:
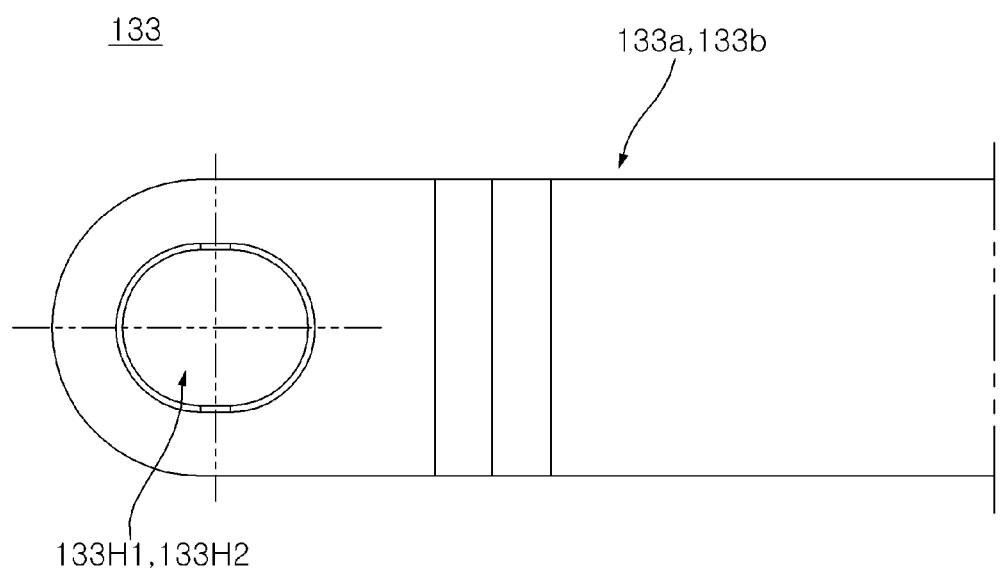

Referring to FIG. 16, the flip frame 133 may be provided with the hole 133H1, 133H2. The hole 133H1, 133H2 may be located adjacent to the distal end of first frame 133a and/or second frame 133b of the flip frame 133. The hole 133H1, 133H2 may be a long hole 133H1, 133H2 having a long axis and a short axis. The long axis of the hole 133H1, 133H2 may be parallel to the longitudinal direction of the frame 133. The short axis of the hole 133H1, 133H2 may intersect the longitudinal direction of the frame 133.

Figure 17:
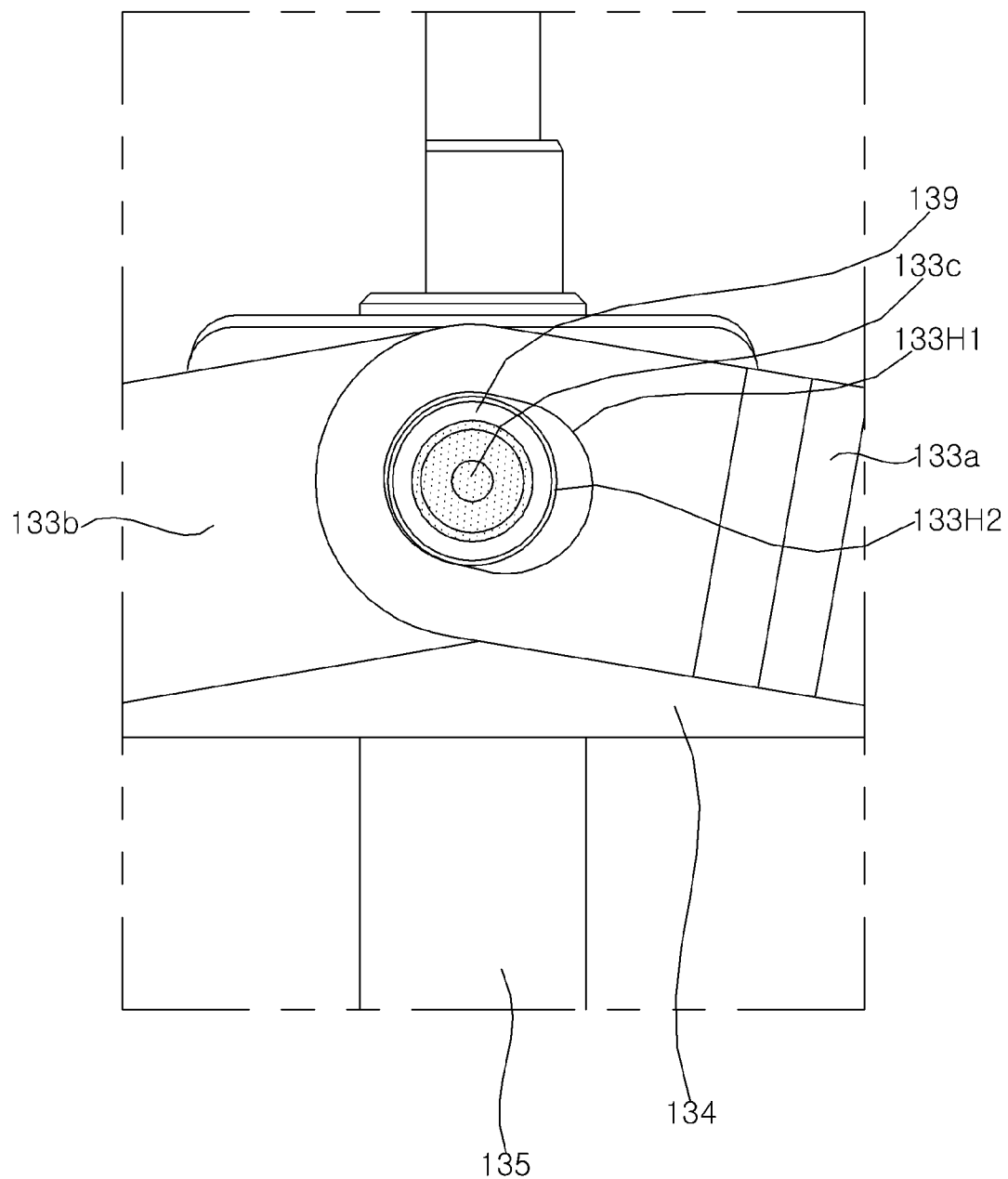
Figure 18:
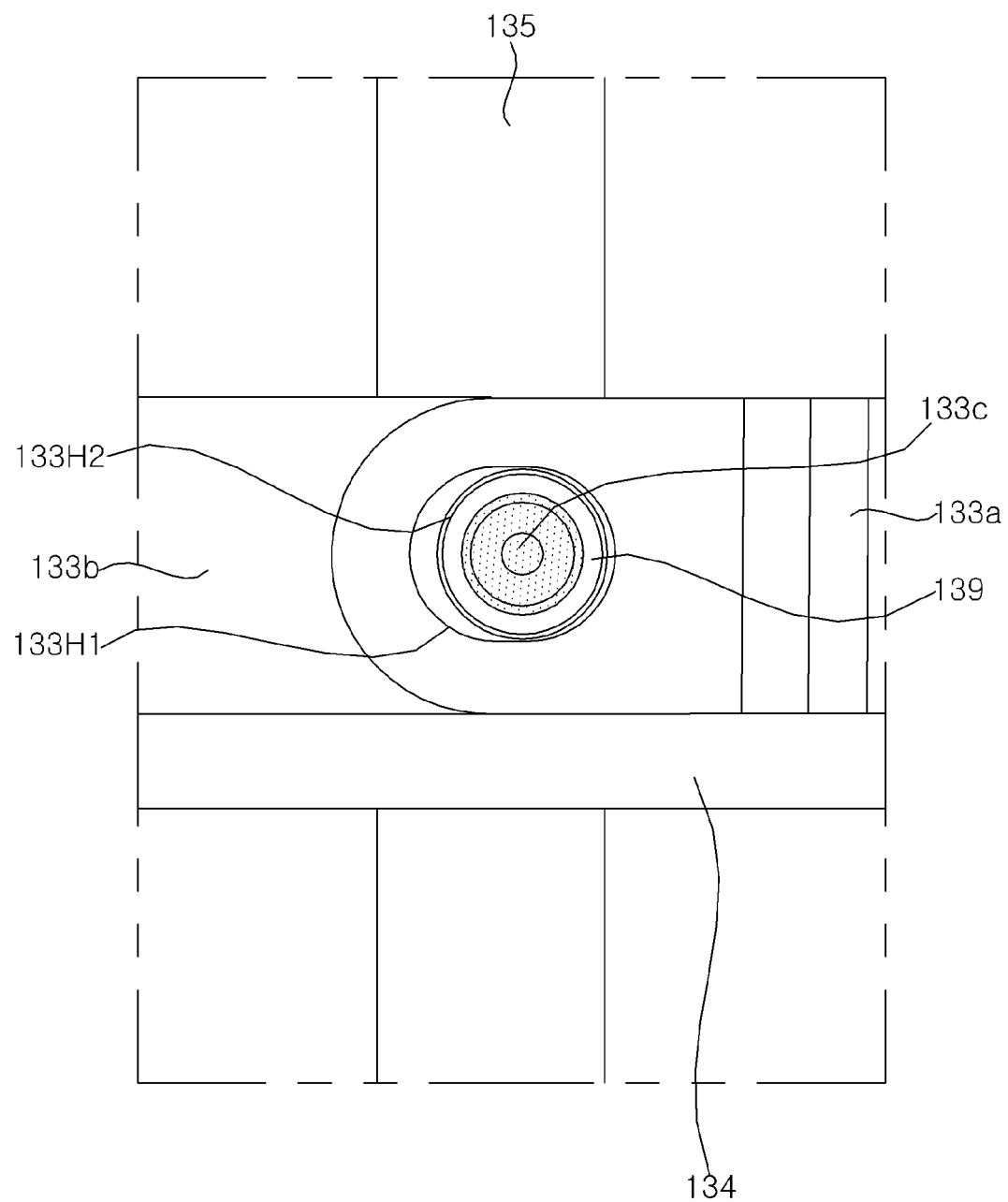
Figure 19:
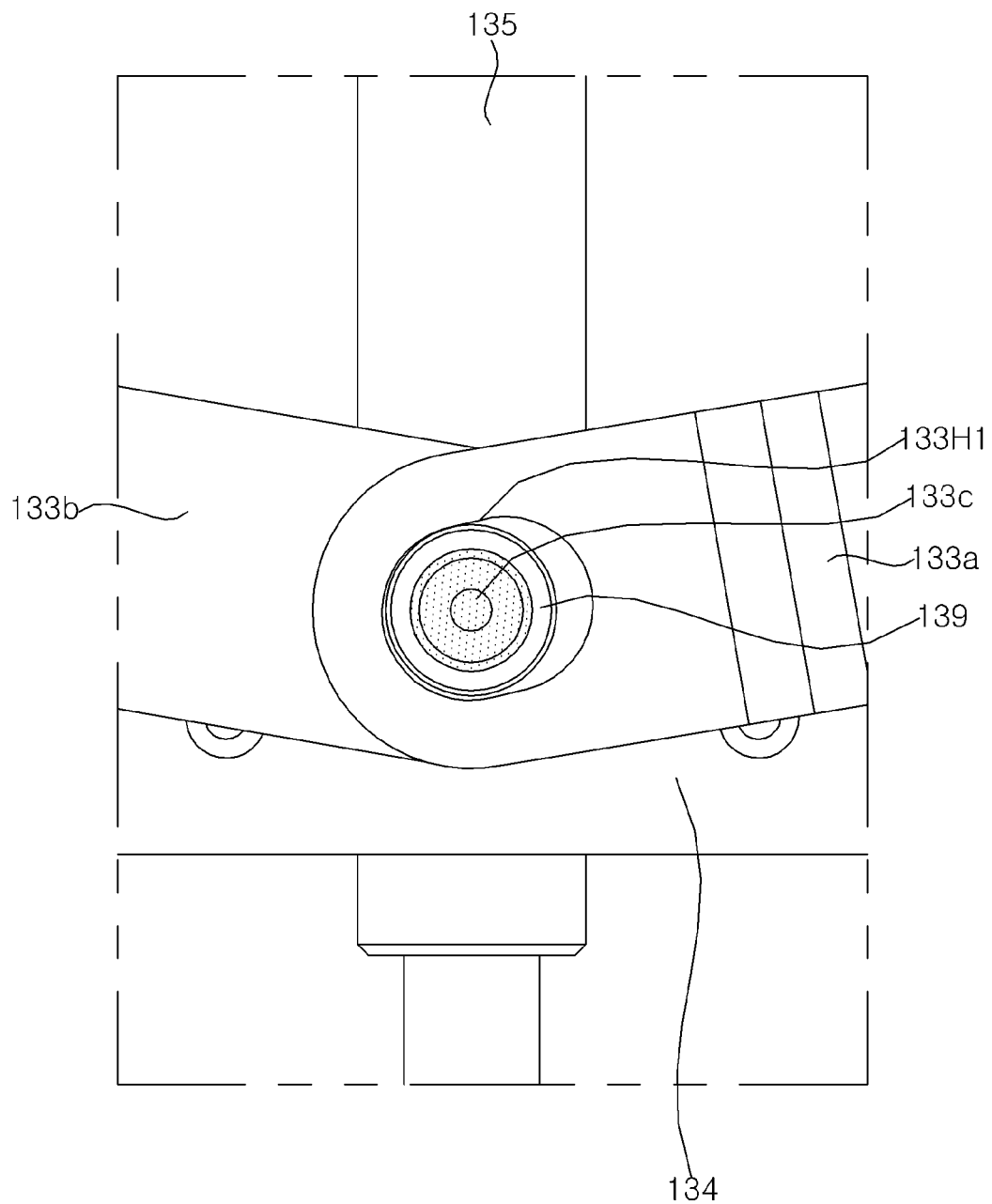

Referring to FIGS. 17 to 19, the pivot pin 133c may be inserted into the hole 133H1, 133H2 of the flip frame 133, and the moving block 134 may move on the lead screw 135. As the moving block 134 moves on the lead screw 135, the display panel 110 may be curved (see FIG. 18) from a flat state (see FIG. 17) at a certain curvature (see FIG. 19).

When the display panel 110 starts to be curved from a flat state, or when the display panel 110 is curved at a certain curvature and then flattens as the radius of curvature becomes larger than a certain radius of curvature, the direction of movement of the moving block 134 may change. That is, at the starting and ending points of the moving block 134, the display panel 110 may be flat or curved with a certain curvature.

When the moving block changes the moving direction at the starting and/or ending point, the direction in which the pivot pin 133c applies force to the hole 133H1, 133H2 of the flip frame 133 may change. By changing the direction in which the pivot pin 133c applies force to the hole 133H1, 133H2 of the flip frame 133, a gap between the pivot pin 133c and the hole 133H1, 133H2 of the flip frame 133 may cause a break in continuity in the change in curvature of the display panel 110.

Figure 20:
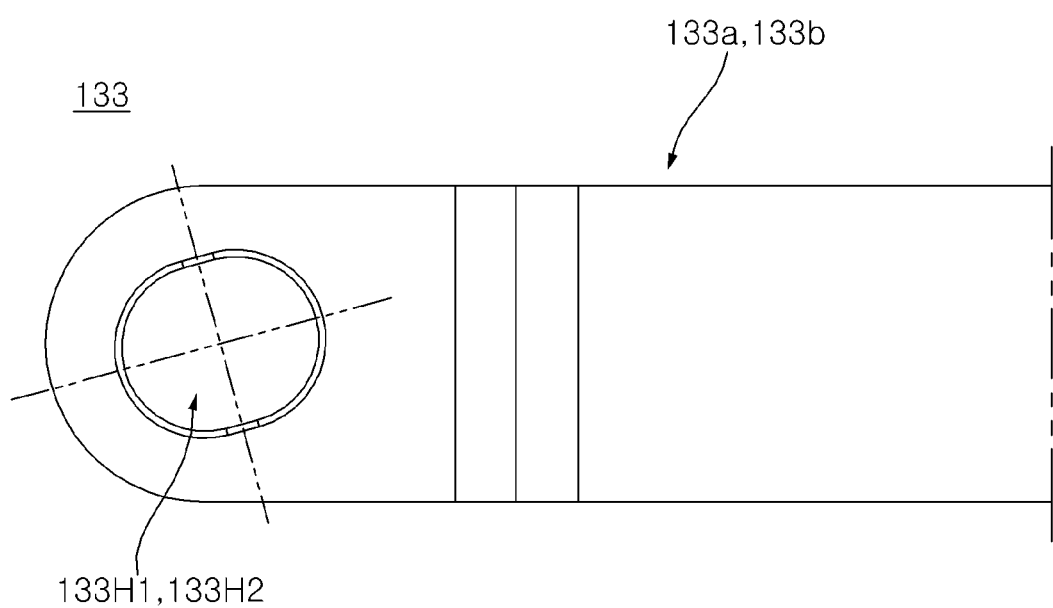
Figure 21:
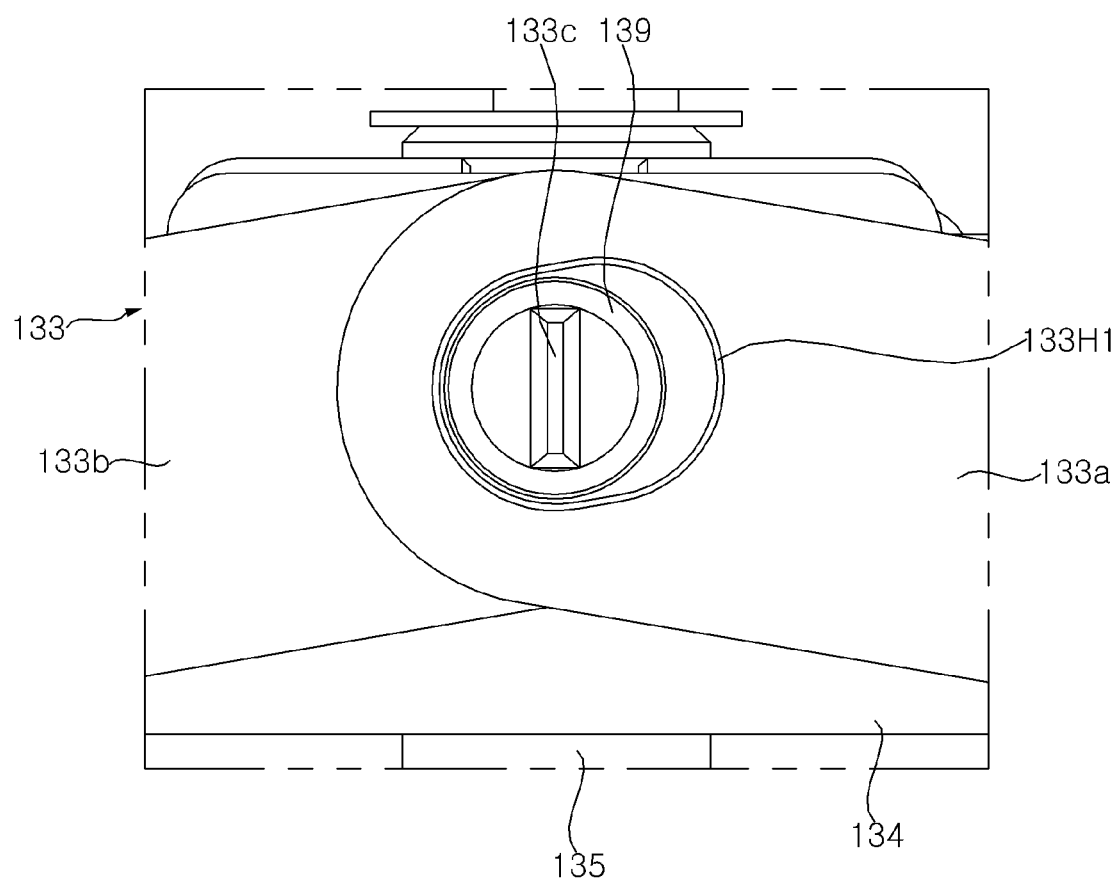

Referring to FIGS. 20 and 21, the long axis of the hole 133H1, 133H2 of the flip frame 133 may form an angle (theta) with respect to the longitudinal direction of the flip frame 133. For example, the angle (theta) may correspond to an angle (theta) formed by the starting point or ending point of the moving block 134 based on a line connecting the pivot shaft 141p, 142p of the wings 141, 142 around the pivot shaft 141P, 142P of the wing 141, 142 (see FIG. 8).

As the hole 133H1, 133H2 of the flip frame 133 approaches the starting point or ending point of the moving block 134, the long axis of the hole 133H1, 133H2 may become parallel to a reference line connecting the pivot shaft 141p, 142p of the wings 141, 142 of the moving block 134. When the pivot pin 133c changes the moving direction, the moving direction of the pivot pin 133c may be aligned with the short axis of the hole 133H1, 133H2 of the flip frame 133.

When the moving direction of the pivot pin 133c is aligned with the short axis of the hole 133H1, 133H2 of the flip frame 133 at the moment the pivot pin 133c changes its moving direction, the gap formed between the pivot pin 133c and the hole 133H1, 133H2 of the flip frame 133 may be minimized. Accordingly, the pivot pin 133c may continuously transmit power or force to the flip frame 133 in response to movement and/or reorientation of the moving block 134.

Figure 22:
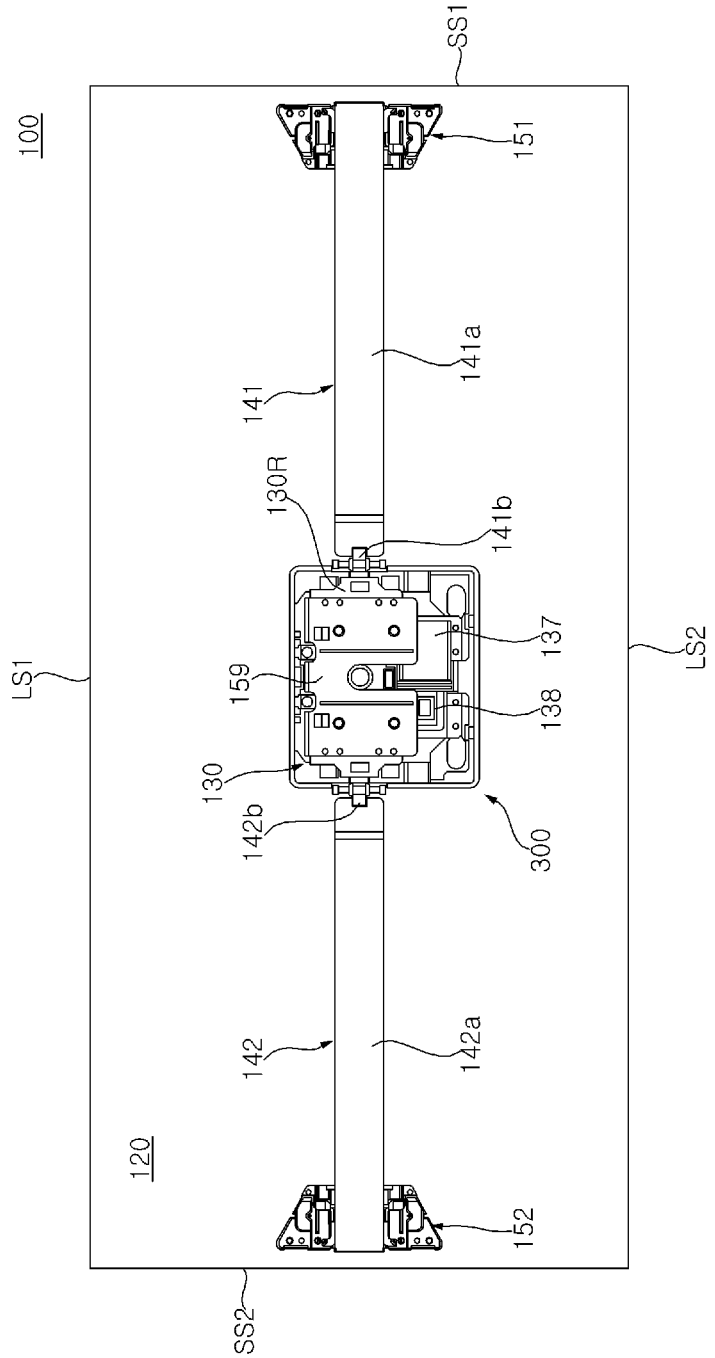
Figure 23:
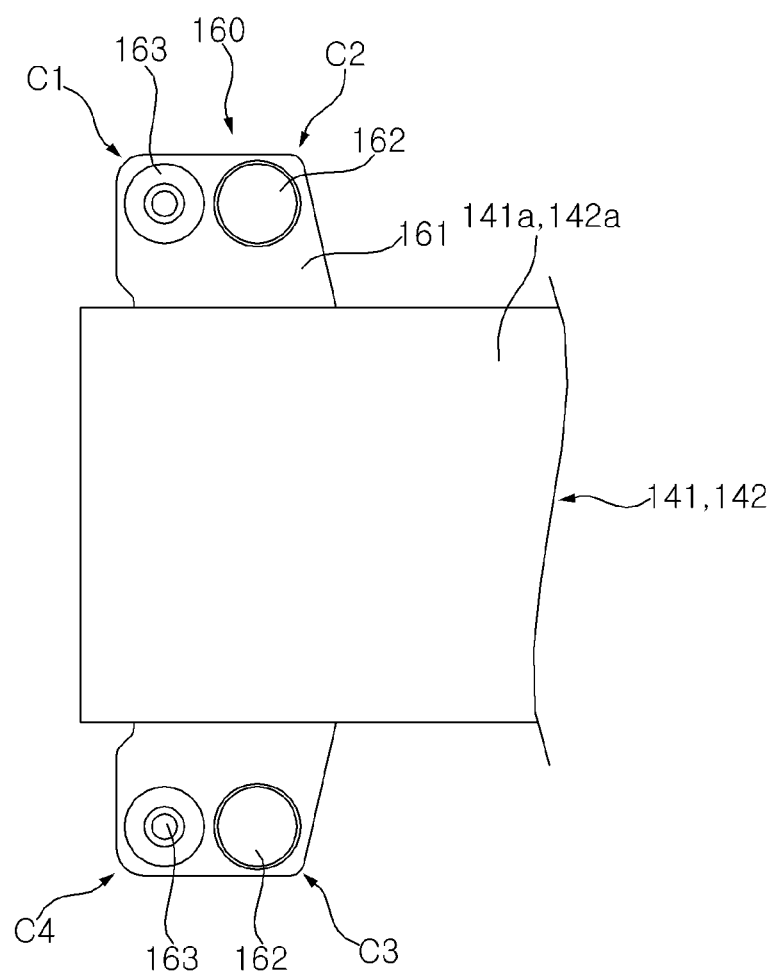

Referring to FIGS. 22 and 23, the first sliding mount 151 may be fixed to the rear surface of the plate 120 while being adjacent to the first short side SS1 of the plate 120. The second sliding mount 152 may be fixed to the rear surface of the plate 120 while being adjacent to the second short side SS2 of the plate 120.

The drive module 130 may be located between the first sliding mount 151 and the second sliding mount 152, and may be coupled to the rear surface of the plate 120. The first wing 141 has one end pivotally connected to the drive module 130, and the other end coupled to the first sliding mount 151. The other end of the first wing 141 may move on the first sliding mount 151. The second wing 142 has one end pivotally connected to the drive module 130, and the other end coupled to the second sliding mount 152. The other end of the second wing 142 may move on the second sliding mount 152.

A PCB plate 159 may be located in the rear side of the drive module 130. The PCB plate 159 may be fixed to the rear bracket 130R (see FIG. 2) of the drive module 130. PCB boards may be coupled to the PCB plate 159.

A side cover 200 may form a wall around the side surfaces of the drive module 130. For example, the side cover 200 may be a square frame. A back cover (not shown) may cover the drive module 130 and may be coupled with the side cover 200.

A slide bracket 160 may be coupled to or fixed to the distal end of the wing 141, 142. The slide bracket 160 may include an elongated plate-shaped body 161 and a protrusion 162, 163 formed adjacent to both ends of the body 161. The protrusion 162, 163 may be referred to as a friction protrusion 162, 163 or a contact protrusion 162, 163. For example, the slide bracket 160 may be made of metal.

There may be a plurality of protrusions 162 and 163. A plurality of protrusions 162 and 163 may include a front protrusion 163 and a rear protrusion 162. The front protrusion 163 may be formed at a first corner C1 and/or a fourth corner C4 of the body 161. The front protrusion 163 may protrude while being pressed toward the front side of the body 161. The front protrusion 163 may have a dome or hemisphere shape. The rear protrusion 162 may be formed at the second corner C2 and/or the third corner C3 of the body 161. The rear protrusion 162 may protrude while being pressed toward the rear side of the body 161. The rear protrusion 162 may have a dome or hemisphere shape. The rear protrusion 162 may be adjacent to the front protrusion 163. The front protrusion 163 and the rear protrusion 162 may be sequentially disposed along the short side of the body 161. A first pair of front protrusions 163 and rear protrusions 162 may face a first pair of front protrusions 163 and rear protrusions 162 with respect to the wing 141, 142.

Figure 24:
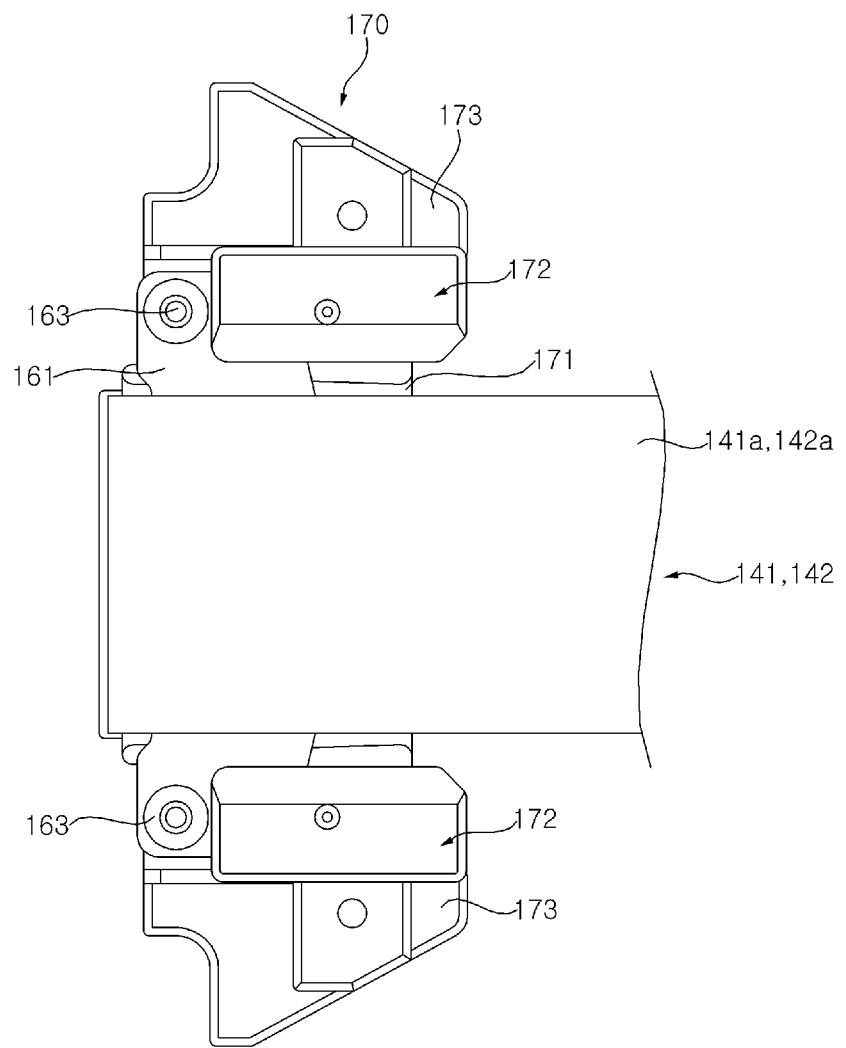
Figure 25:
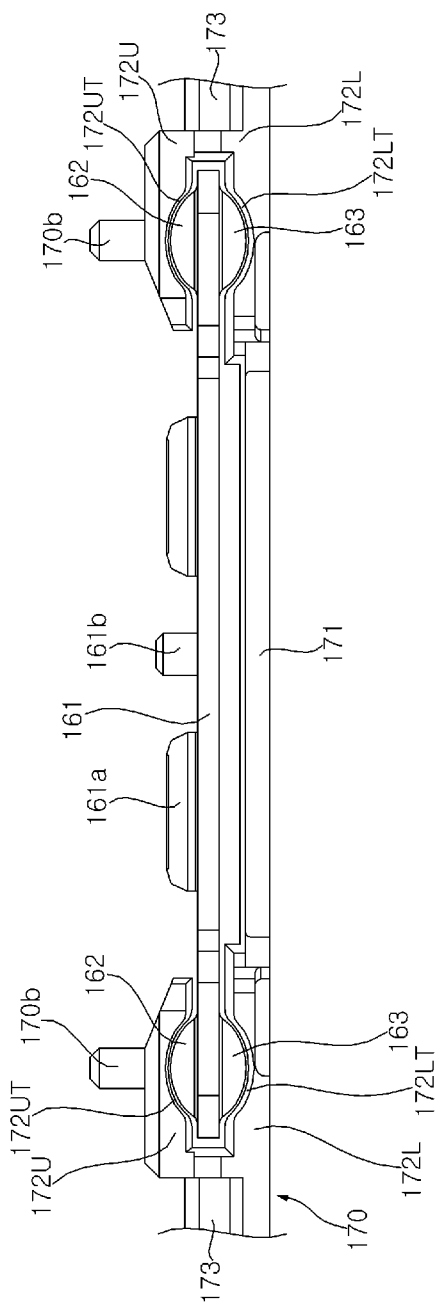

Referring to FIGS. 24 and 25, the slide bracket 160 may be coupled to the guide cover 170. The slide bracket 160 may be inserted into the guide cover 170 and may move in the guide cover 170. For example, the guide cover 170 may be a synthetic resin with low friction. The guide cover 170 may be a low friction material. For example, the guide cover 170 may be a POM acetal homopolymer material.

The guide cover 170 may include a base 171, a side rail 172, and a fixing plate 173. The base 171 has an elongated plate shape and may face the slide bracket 160. The side rail 172 may be formed at both ends of the base 171. The side rail 172 may include a lower part 172L and an upper part 172U. The lower part 172L may extend from the base 171.

A lower trench 172LT may be formed in the lower part 172L. The lower trench 172LT may be formed in the lower part 172L as the upper surface of the lower part 172L is long recessed inward. For example, the lower trench 172LT may have a half-pipe shape. The front protrusion 163 of the slide bracket 160 may move on the lower trench 172LT. The radius of curvature of the front protrusion 163 may be smaller than the radius of curvature of the lower trench 172LT. Accordingly, the front protrusion 163 may be in point contact with the lower trench 172LT.

The upper part 172U may be spaced apart from the lower part 172L and may face the lower part 172L. A gap may be formed between the upper part 172U and the lower part 172L, and the slide bracket 160 may be inserted into the gap. An upper trench 172UT may be formed in the upper part 172U. The upper trench 172UT may be formed in the upper part 172U as the lower surface of the upper part 172U is long recessed inward. For example, the upper trench 172UT may have a half-pipe shape. The rear protrusion 162 of the slide bracket 160 may move on the upper trench 172UT. The radius of curvature of the rear protrusion 162 may be smaller than the radius of curvature of the upper trench 172UT. Accordingly, the rear protrusion 162 may be in point contact with the upper trench 172UT.

The slide bracket 160 and the guide cover 170 may be coupled to prevent the wing 141, 142 from sagging due to its own weight.

The slide bracket 160 may include a coupling portion 161a and a pem nut 161b or a coupling protrusion 161b for coupling with the wing 141, 142. The guide cover 170 may include a pem nut or coupling protrusion 170b for coupling with the sliding mount 151, 152.

Figure 26:
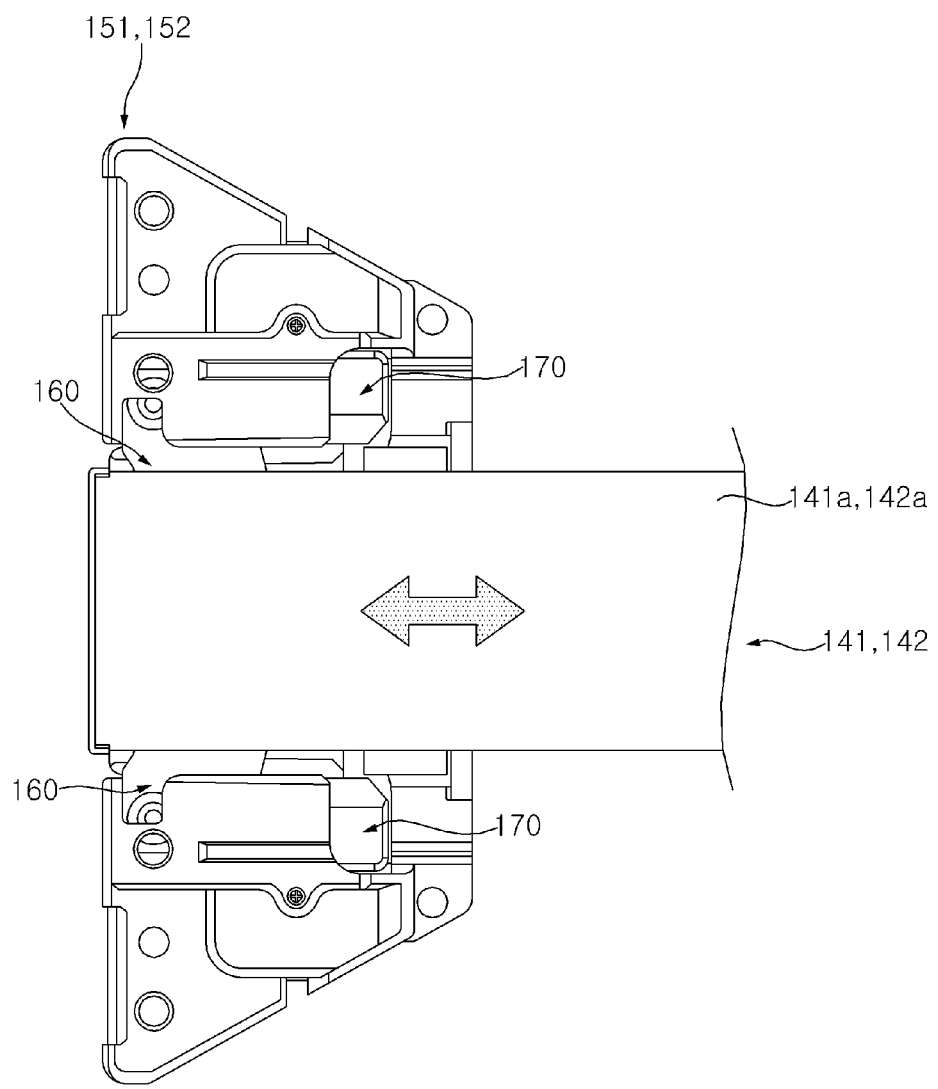
Figure 27:
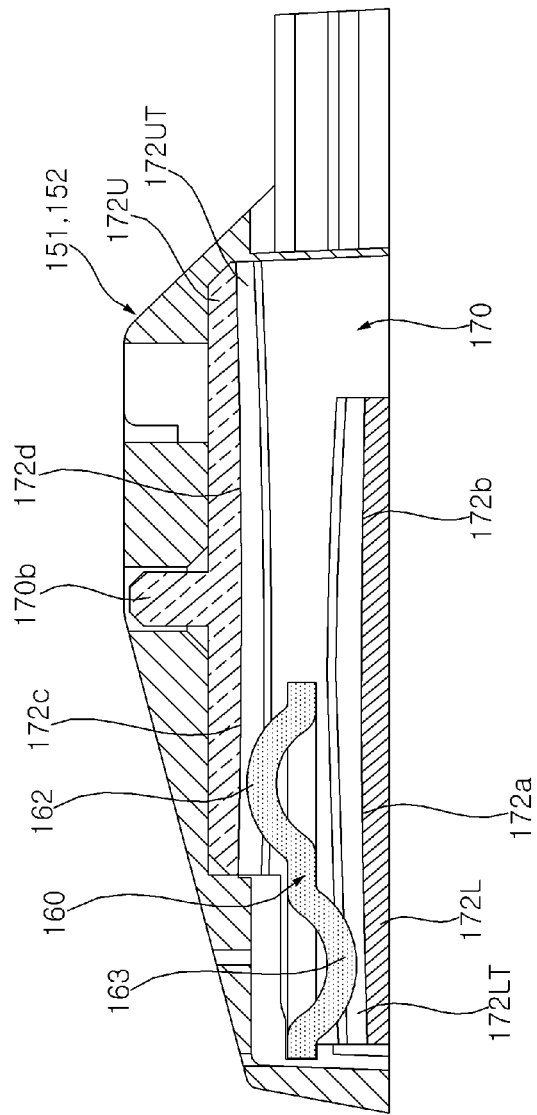
Figure 28:
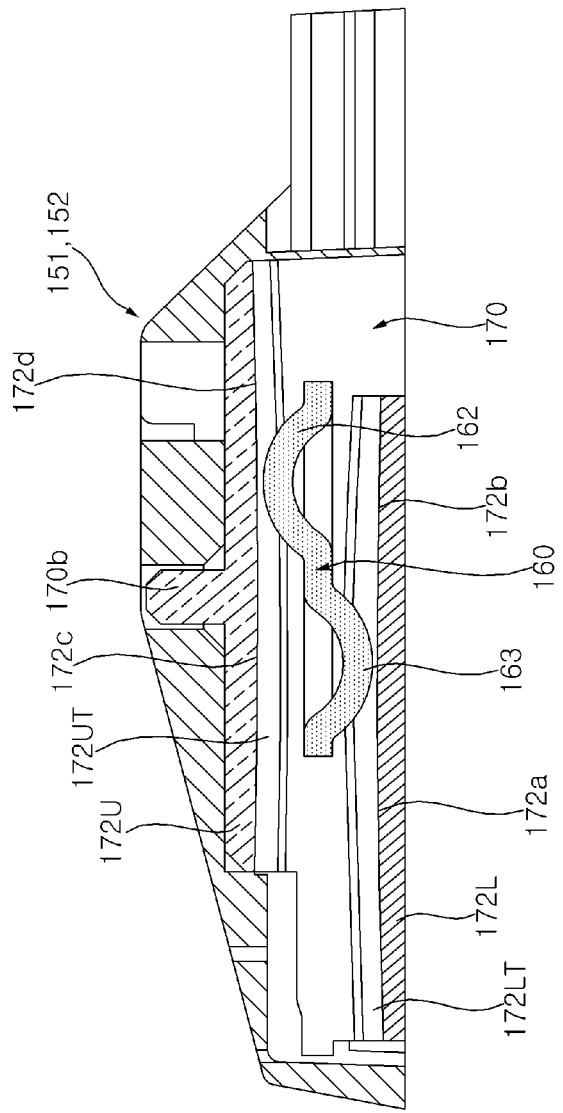

Referring to FIGS. 26 to 28, the slide bracket 160 may be coupled to the front surface of the wing blade 141a, 142b while being adjacent to the distal end of the wing 141, 142. The guide cover 170 may be fixed to the sliding mount 151, 152. The slide bracket 160 may be inserted into the guide cover 170, and may reciprocate in the longitudinal direction of the wing 141, 142 in the guide cover 170.

When the display panel 110 is curved at a certain curvature and then becomes flat, the slide bracket 160 may move in the guide cover 170 toward the short side SS1, SS2 of the plate 120. The front protrusion 163 may move in the lower trench 172LT. The front protrusion 163 may move in the lower trench 172LT while contacting or gently rubbing against the surface of the lower trench 172LT. The rear protrusion 162 may move in the upper trench 172UT while contacting or gently rubbing against the surface of the upper trench 172UT.

When the display panel 110 is flat and then curved at a certain curvature, the slide bracket 160 may move in the guide cover 170 from the short side SS1, SS2 of the plate 120 toward the drive module 130. The front protrusion 163 may move in the lower trench 172LT. The front protrusion 163 may move in the lower trench 172LT while contacting or gently rubbing against the surface of the lower trench 172LT. The rear protrusion 162 may move in the upper trench 172UT while contacting or gently rubbing against the surface of the upper trench 172UT.

As the protrusion 162, 163 and the trench 172LT, 172UT come into point contact, friction is reduced and wear caused by friction may be improved, and the structural durability of the mechanism can be improved as no lubricant is required.

Figure 29:
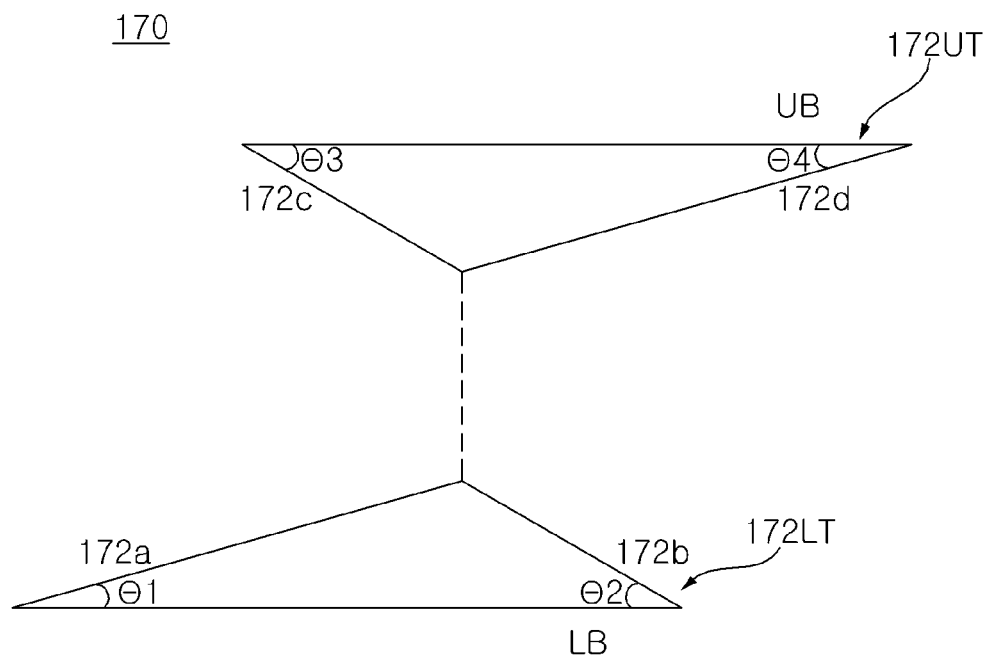

Referring to FIG. 29, the lower trench 172LT may include a first inclined surface 172a and a second inclined surface 172b, and the upper trench 172UT may include a third inclined surface 172c and a fourth inclined surface 172d. The first inclined surface 172a may form a first angle (theta1) with respect to a base surface LB. The second inclined surface 172b may form a second angle (theta2) with respect to the base surface LB. The second inclined surface 172b may contact the first inclined surface 172a.

The third inclined surface 172c may form a third angle (theta3) with respect to the base surface UB. The fourth inclined surface 172d may form a fourth angle (theta4) with respect to the base surface UB. The fourth inclined surface 172d may be in contact with the third inclined surface 172c. The boundary of the third inclined surface 172c and the fourth inclined surface 172d may correspond to or be aligned with the boundary of the first inclined surface 172a and the second inclined surface 172b. For example, the boundary of the third inclined surface 172c and the fourth inclined surface 172d may be aligned with the boundary of the first inclined surface 172a and the second inclined surface 172b in the vertical direction.

The second angle (theta2) may be larger than the first angle (theta1). The third angle (theta3) may be larger than the fourth angle (theta4). The length of the first inclined surface 172a may be larger than the length of the second inclined surface 172b. The length of the fourth inclined surface 172d may be larger than the length of the third inclined surface 172c. The third inclined surface 172c may face the first inclined surface 172a, and the second inclined surface 172b may face the fourth inclined surface 172d.

Figure 30:
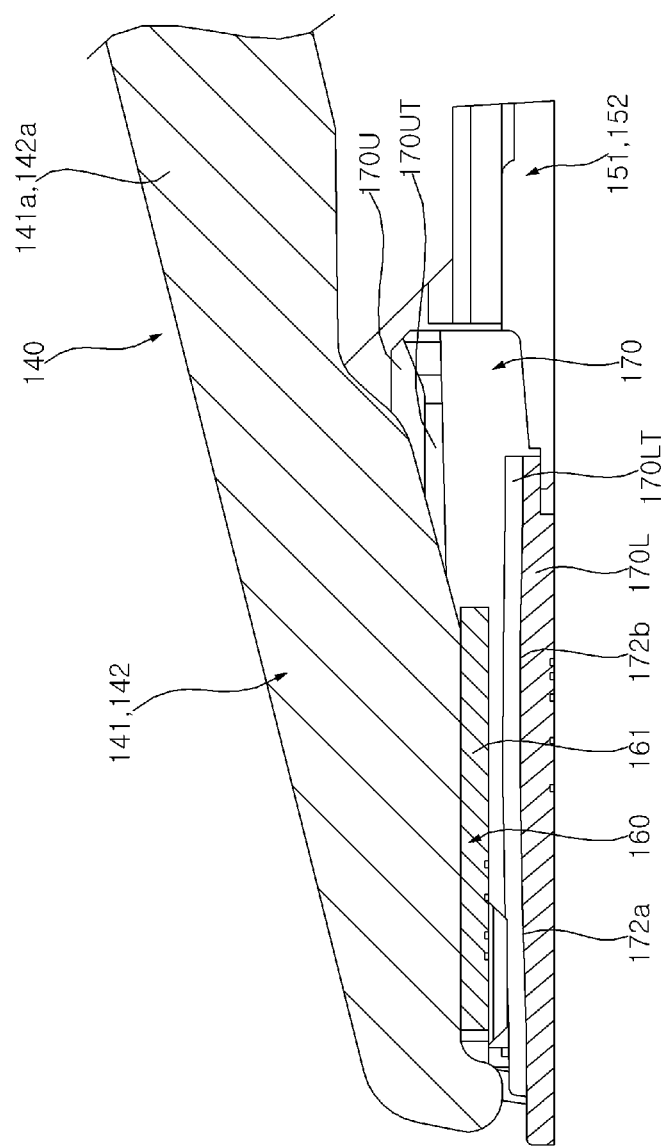

Referring to FIG. 30 together with FIG. 26, the slide bracket 160 to which the wing 140 is coupled may be inserted or coupled to the guide cover 170 and the sliding mount 151, 152. When the wing 151, 152 pivots and moves about the drive module 130, the slide bracket 160 may move in the longitudinal direction of wing 140 in the guide cover 170.

When the wing 140 curves the flat display panel 110, the slide bracket 160 may move from the first inclined surface 172a to the second inclined surface 172b. When the wing 140 flattens the display panel 110 curved at a certain curvature, the slide bracket 160 may move from the second inclined surface 172b to the first inclined surface 172a.

Referring to FIG. 27 together, while the wing 140 curves the flat display panel 110, the front protrusion 163 of the slide bracket 160 may slide while contacting the lower trench 172LT. The front protrusion 163 may press and rub against the lower trench 172LT. The rear protrusion 162 may slide while contacting the upper trench 172UT or may slide while being supported by the upper trench 172UT.

While the wing 140 flattens the display panel 110 curved at a certain curvature, the front protrusion 163 of the slide bracket 160 may slide while contacting the lower trench 172LT or may slide while being supported by the lower trench 172LT. The rear protrusion 162 may slide while contacting the upper trench 172UT or may slide while being supported by the upper trench 172UT.

Accordingly, when the display panel 110 is curved, the curved curvature may become a normal curvature at a certain curvature or become close to a normal curvature.

Figure 31:
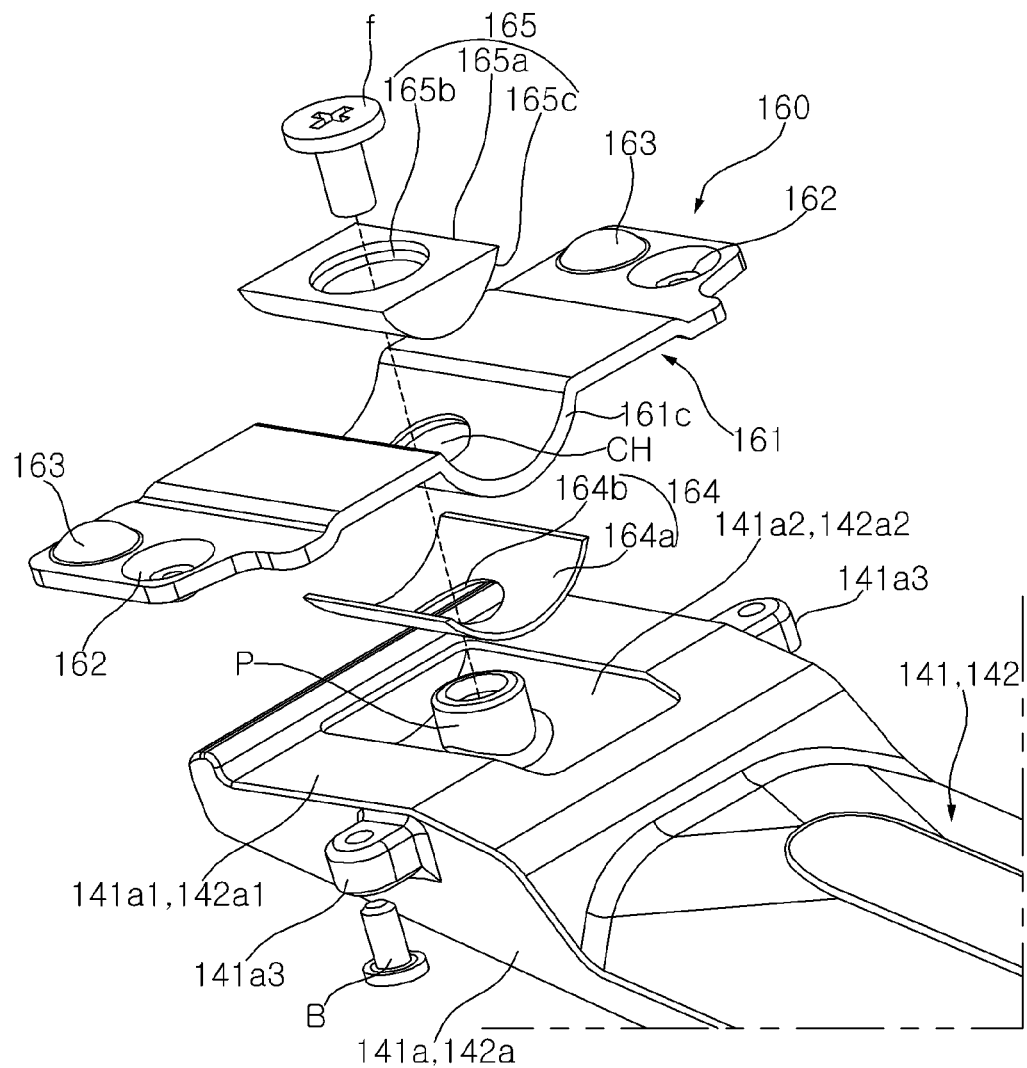
Figure 32:
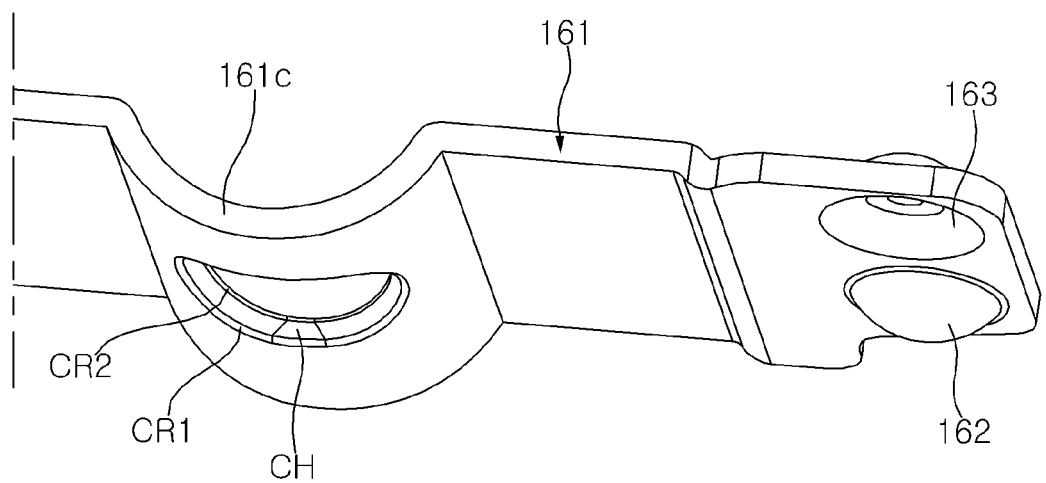
Figure 33:
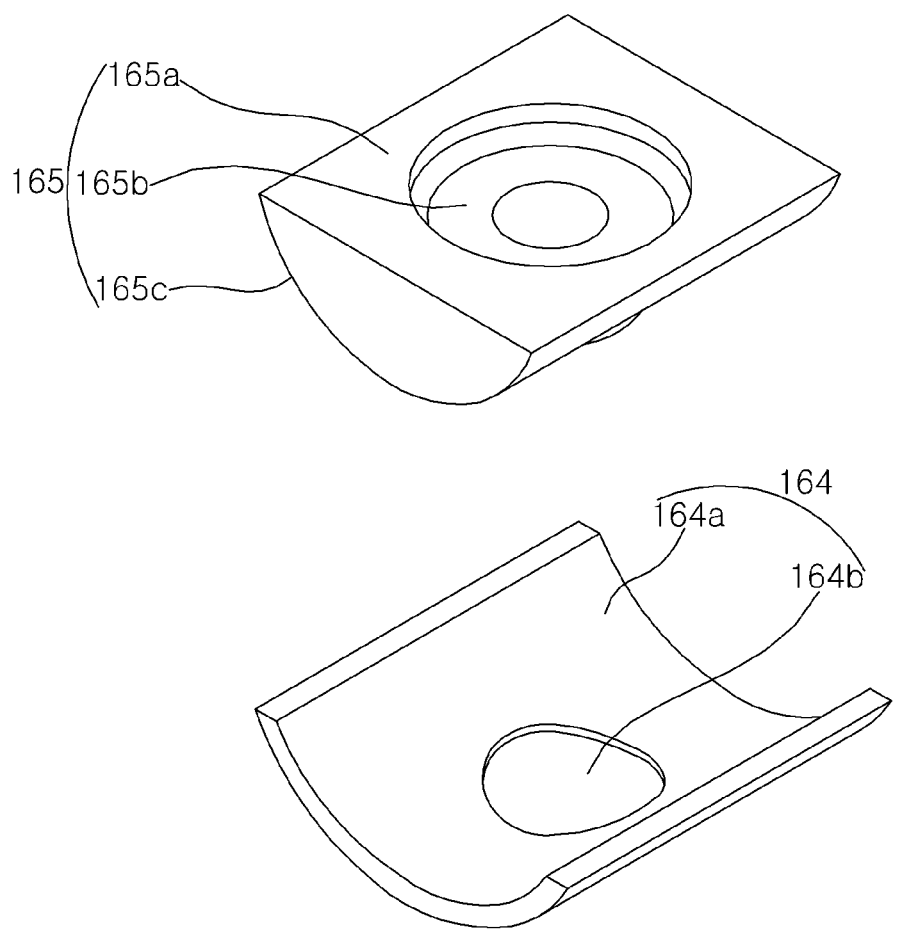

Referring to FIGS. 31 to 33, the blade 141a, 142a of the wing 141, 142 may include a palm portion 141a1, 142a1. The palm portion 141a1, 142a1 may be formed on the front surface of the blade 141a, 142a while being adjacent to the distal end of the blade 141a, 142a of the wing 141, 142. A recessed portion 141a2, 142a2 may be formed on the palm portion 141a1, 142a1. For example, the recessed portion 141a2, 142a2 may be formed by recessing inwardly in a half-pipe shape or by deleting the palm portion 141a1, 142a1. A fastening portion P may be formed in the palm portion 141a1, 142a1. The fastening portion P may be formed to protrude from the outer surface of the recessed portion 141a2, 142a2 of the palm portion 141a1, 142a1. For example, the fastening portion P may be a protruding nut.

A lower supporter 164 may be located on the recessed portion 141a2, 142a2 of the palm portion 141a1, 142a1. A body 164a of the lower supporter 164 may be a curved plate. For example, the lower supporter 164 may be synthetic resin, and may have an outer surface having a low coefficient of friction. For another example, the lower supporter 164 may be a crystalline thermoplastic. For another example, the lower supporter 164 may be POM resin. The lower supporter 164 may be provided with a fastening hole 164b. The fastening hole 164b may be formed in the body plate 164a of the lower supporter 164. The fastening hole 164b may correspond to a fastening portion P of the recessed portion 141a2, 142a2. The fastening portion P of the recessed portion 141a2, 142a2 may be inserted into the fastening hole 164b of the lower supporter 164.

The slide bracket 160 may face the palm portion 141a1, 142a1, and may be coupled to the palm portion 141a1, 142a1 and the recessed portion 141a2, 142a2. The body 161 of the slide bracket 160 may have a plate shape. The body 161 may be provided with a curved part 161c. The curved part 161c may be formed by pressing the body 161. A fastening hole CH may be formed by pressing the curved part 161c. The fastening hole CH of the body 161 of the slide bracket 160 may correspond to the fastening hole 164b of the lower supporter 164. The fastening portion P of the recessed portion 141a2, 142a2 may be inserted into the fastening hole 164b of the lower supporter 164 and the fastening hole CH of the body 161 of the slide bracket 160. The fastening hole CH of the slide bracket 160 may be a long hole. The long axis of the fastening hole CH may be aligned in the longitudinal direction of the slide bracket 160.

The upper supporter 165 may be located in the curved part 161c of the body 161 of the slide bracket 160. The upper supporter 165 may have a semicylindrical shape. For example, the upper supporter 165 may be a synthetic resin, and have an outer surface having a low coefficient of friction. For another example, the upper supporter 165 may be a crystalline thermoplastic plastic. For another example, the upper supporter 165 may be a POM resin. The upper supporter 165 may include a fastening hole 165b. The fastening hole 165b may be formed in the body 165a of the upper supporter 165. The fastening hole 165b may correspond to the fastening portion P of the recessed portion 141a2, 142a2 of the palm portion 141a1, 142a1. A fastening member f may penetrate the fastening hole 165b of the upper supporter 165, the fastening hole CH of the body 161 of the slide bracket 160, and the fastening hole 164b of the lower supporter 164, and may be coupled and fixed to the fastening portion P of the recessed portion 141a2, 142a2 of the palm portion 141a1, 142a1.

A level protrusion 141a3, 142a3 may be located in both sides of the palm portion 141a1, 142a1. The level protrusion 141a3, 142a3 may protrude from one side surface of the blade 141a, 142a of the wing 141, 142 while being adjacent to both sides of the palm portion 141a1, 142a1. There may be a plurality of level protrusions 141a3, 142a3, and a plurality of level protrusions 141a3, 142a3 may protrude from both side surfaces of the blade 141a, 142a. A leveling bolt B may be inserted into the level protrusion 141a3, 142a3, and may rotate.

The curvature of the curved surface 165c of the body 165a of the upper supporter 165 may correspond to the curvature of the curved part 161c of the slide bracket 160, and the curvature of the curved part 161c of the slide bracket 160 may correspond to the curvature of the body plate 164a of the lower supporter 164.

Referring to FIG. 32, the fastening hole CH formed in the curved part 161c of the slide bracket 160 may have a round shape as the edge of the hole CH is tapered. A first tapered portion CR1 may be formed at the lower end edge of the fastening hole CH, and a second tapered portion CR2 may be formed at the upper end edge of the fastening hole CH. Accordingly, the slide bracket 160 may move or pivot with respect to the fastening portion P at between the upper supporter 165 and the lower supporter 164, thereby preventing damage to the upper supporter 165 and the lower supporter 164.

Figure 34:
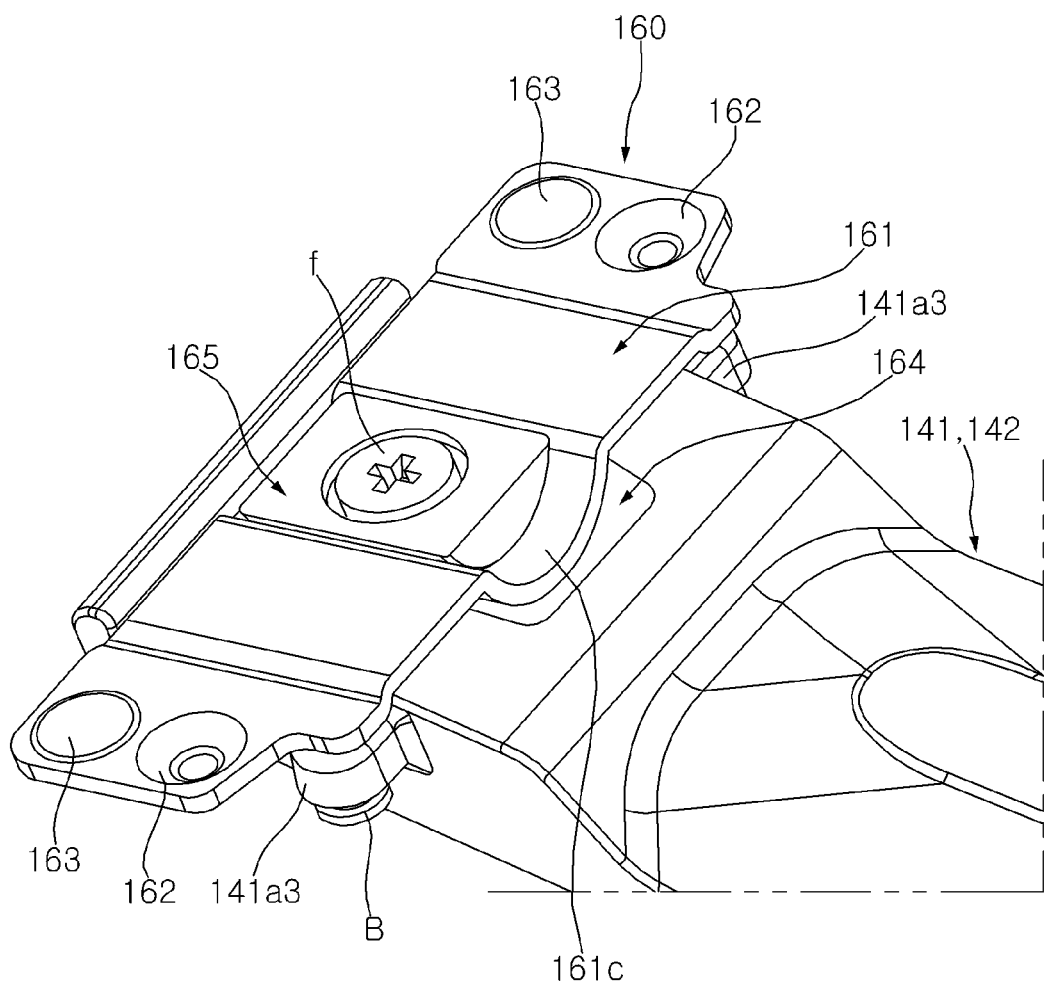
Figure 35:
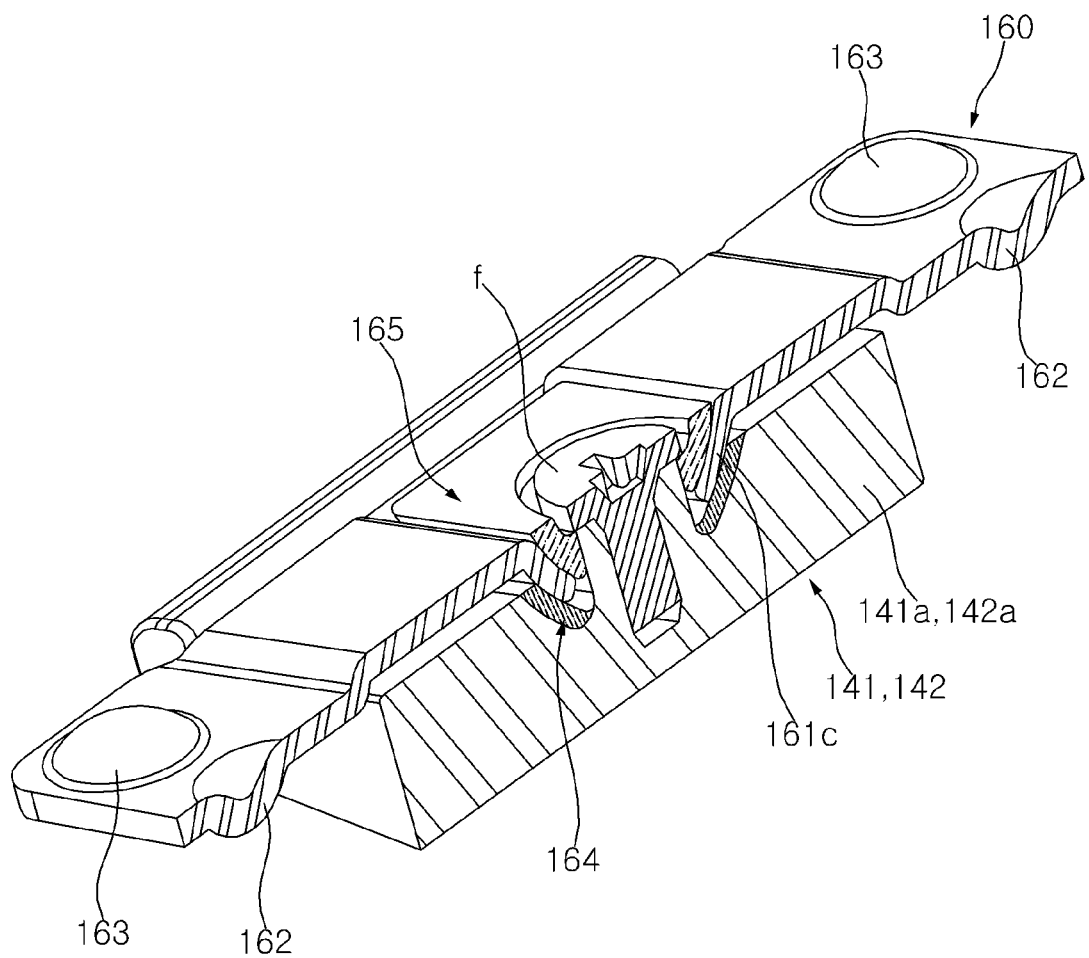

Referring to FIGS. 34 and 35, the lower supporter 164 may be inserted into the recessed portion 141a2, 142a2 of the palm portion 141a1, 142a1 and supported on the recessed portion 141a2, 142a2. The lower surface of the lower supporter 164 may be in contact with the outer surface of the recessed portion 141a2, 142a2. The slide bracket 160 may face the palm portion 141a1, 142a1, and the lower surface of the curved part 161c may face or contact the upper surface of the lower supporter 164. The upper supporter 165 may be located on the curved part 161c, and the lower surface of the upper supporter 165 may be supported on or contact the upper surface of the curved part 161c. The fastening member f may be inserted into the upper supporter 165, and the upper supporter 165, the slide bracket 160, and the lower supporter 164 may be fixed to the recessed portion 141a2, 142a2 of the palm portion 141a1, 142a1 of the blade 141a, 142a.

The fastening hole CH (see FIG. 31) of the slide bracket 160 may be circular, and the diameter of the fastening hole CH may be larger than the outer diameter of the fastening portion P of the recessed portion 141a2, 142a2. The fastening hole CH of the slide bracket 160 may be a long hole, the length of the long axis may be larger than the outer diameter of the fastening portion P of the recessed portion 141a2, 142a2, and the length of the short axis may correspond to the outer diameter of the fastening portion P of the recessed portion 141a2, 142a2. Accordingly, the slide bracket 160 may seesaw on the palm portion 141a1, 142a1 of the blade 141a, 142a.

Figure 36:
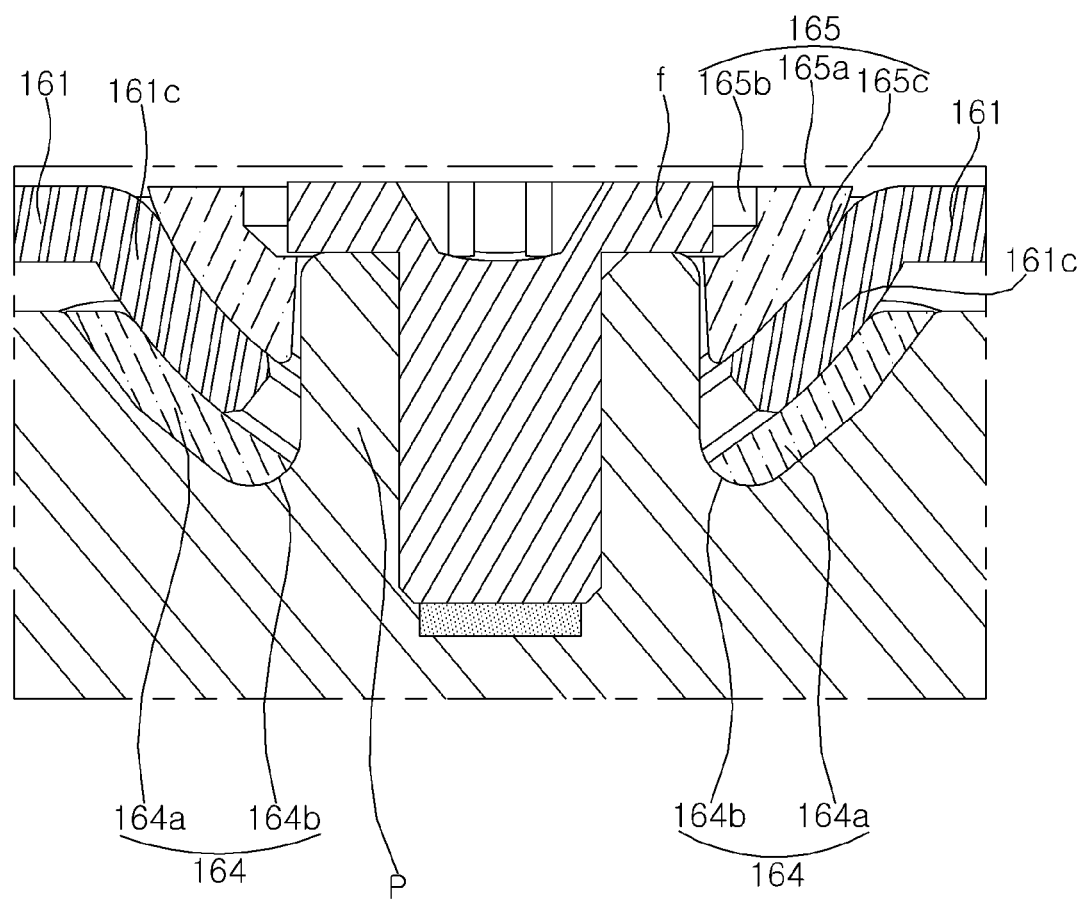
Figure 37:
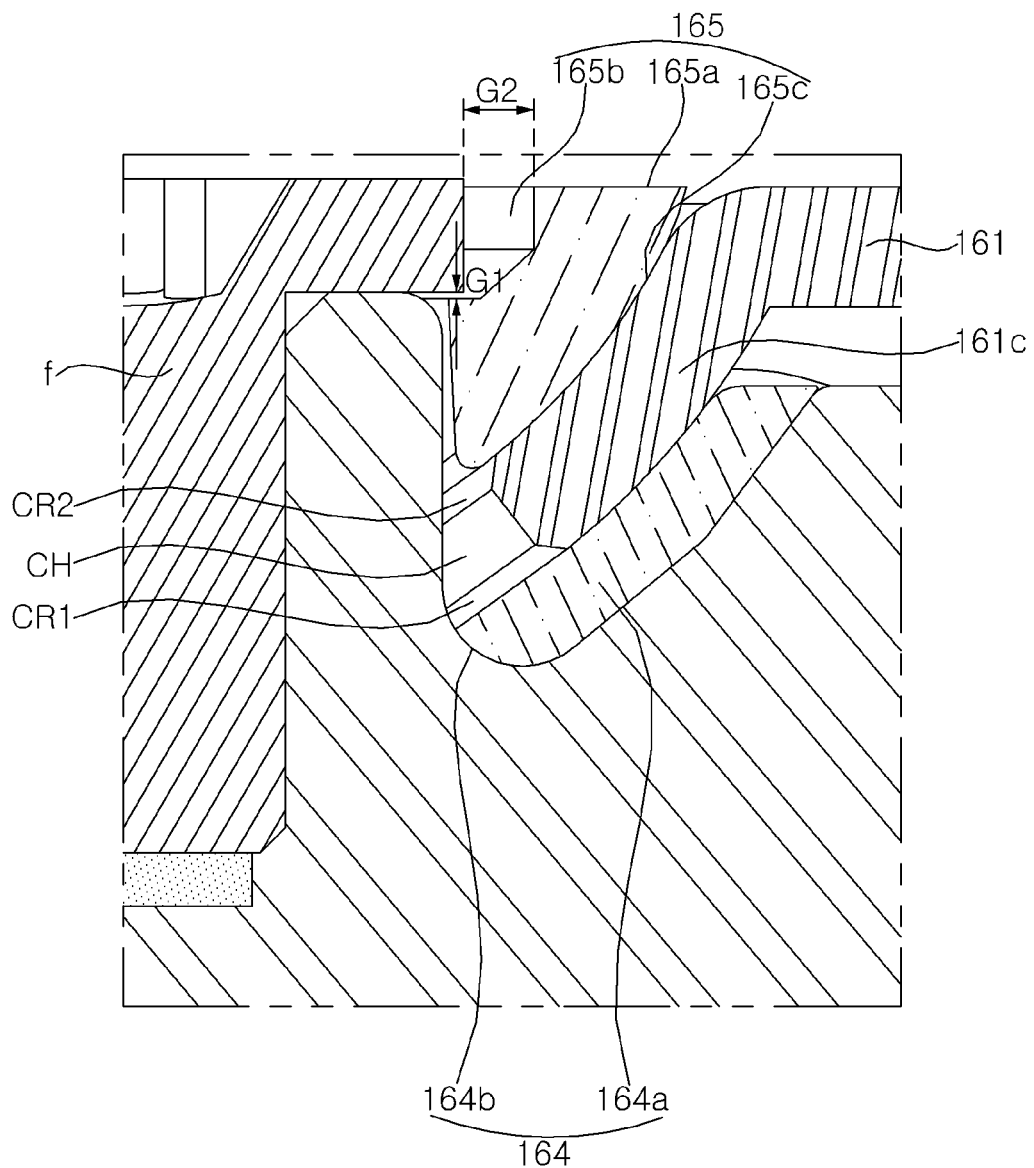

Referring to FIGS. 36 and 37, the upper surface of the lower supporter 164 may contact the lower surface of the curved part 161c of the body 161 (see FIG. 35) of the slide bracket 160. The lower surface of the upper supporter 165 may be in contact with the upper surface of the curved part 161c of the body 161 of the slide bracket 160. The head of the fastening member f may be in contact with the upper end of the fastening portion P. For example, the fastening member f may be a bolt, and the fastening portion P may be a nut. As the fastening member f is screw-coupled to the fastening portion P, the head of the fastening member f may be in close contact with the upper end of the fastening portion P.

The head of the fastening member f may form a first gap G1 with the upper end of the fastening hole 165b of the upper supporter 165. The head of the fastening member f may form a second gap G2 with the inner surface of the body 165a of the upper supporter 165. The outer diameter of the fastening portion P may be smaller than the diameter of the fastening hole 165b of the upper supporter 165. The diameter of the fastening hole 164b of the lower supporter 164 may be larger than the outer diameter of the fastening portion P. The diameter of the fastening hole 164b of the lower supporter 164 may be substantially equal to the diameter of the fastening hole 165b of the upper supporter 165. Accordingly, a gap for movement of the slide bracket 160 may be formed. For example, the movement of the slide bracket 160 may be pivoting and/or seesawing.

Figure 38:
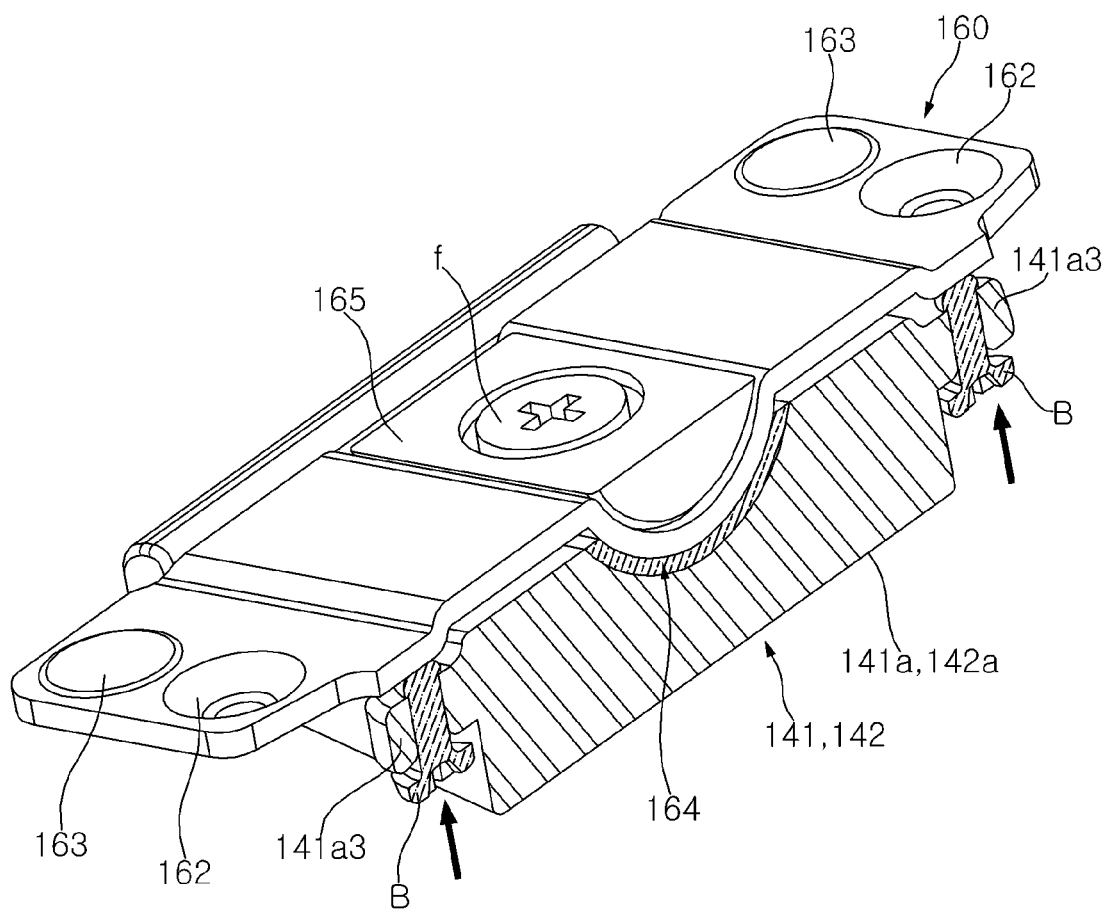
Figure 39:
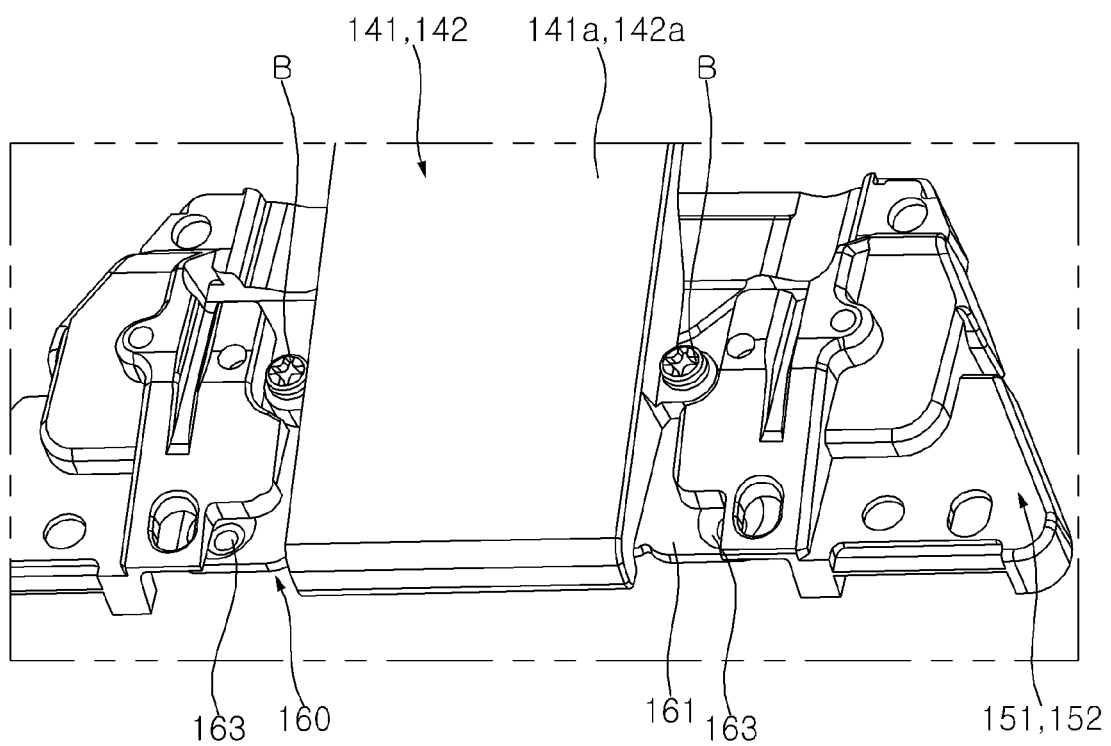

Referring to FIGS. 38 and 39, the leveling bolt B coupled to a leveling protrusion 141a3, 142a3 may be spaced apart from the outer surface of the body 161 of the slide bracket 160, support the outer surface, or contact the outer surface.

There may be a plurality of leveling protrusions 141a3, 142a3, and the plurality of leveling protrusions 141a3, 142a3 may include a first protrusion 141a3, 142a3 and a second protrusion 141a3, 142a3. The first protrusion 141a3, 142a3 may be located in one side of the long side of the blade 141a, 142a of the wing 141, 142, and the second protrusion 141a3, 142a3 may be located in the other side of the long side of the blade 141a, 142a. The first protrusion 141a3, 142a3 may be opposite to the second protrusion 141a3, 142a3 with respect to the blade 141a, 142a. The first protrusion 141a3, 142a3 and the second protrusion 141a3, 142a3 may be located adjacent to the distal end of the blade 141a, 142a. The first protrusion 141a3, 142a3 and the second protrusion 141a3, 142a3 may be located to overlap the slide bracket 160. The leveling protrusions 141a3, 142a3 may be formed in the side of the blade 141a, 142a at between the friction protrusions 162 and 163 of the slide bracket 160 and the blade 141a, 142a of the wing 141, 142.

There may be a plurality of leveling bolts B, and the plurality of leveling bolts B may include a first leveling bolt B and a second leveling bolt B. The first leveling bolt B may be inserted into the first leveling protrusion 141a3, 142a3 and may move while rotating. The second leveling bolt B may be inserted into the second leveling protrusion 141a3, 142a3 and may move while rotating. The moving direction of the leveling bolt B may be in a direction from the wing 141, 142 toward the slide bracket 160.

Figure 40:
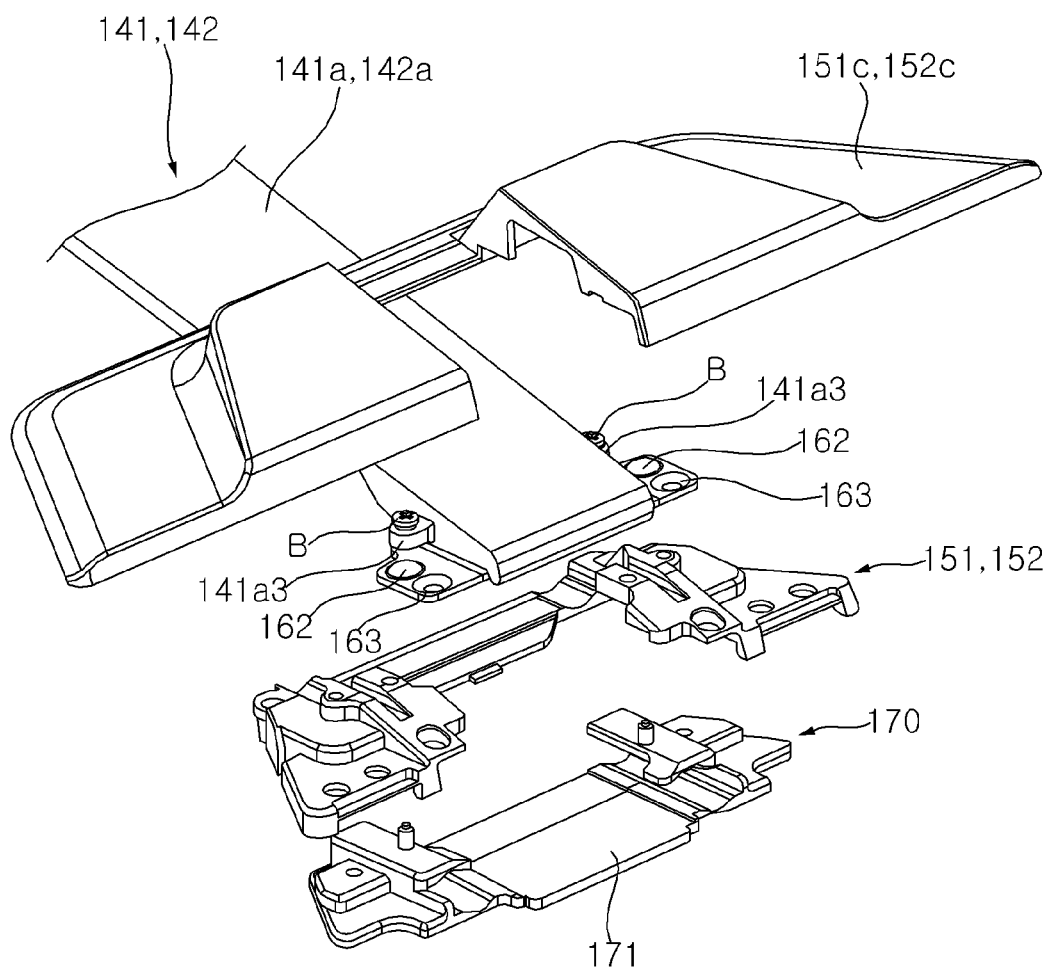
Figure 41:
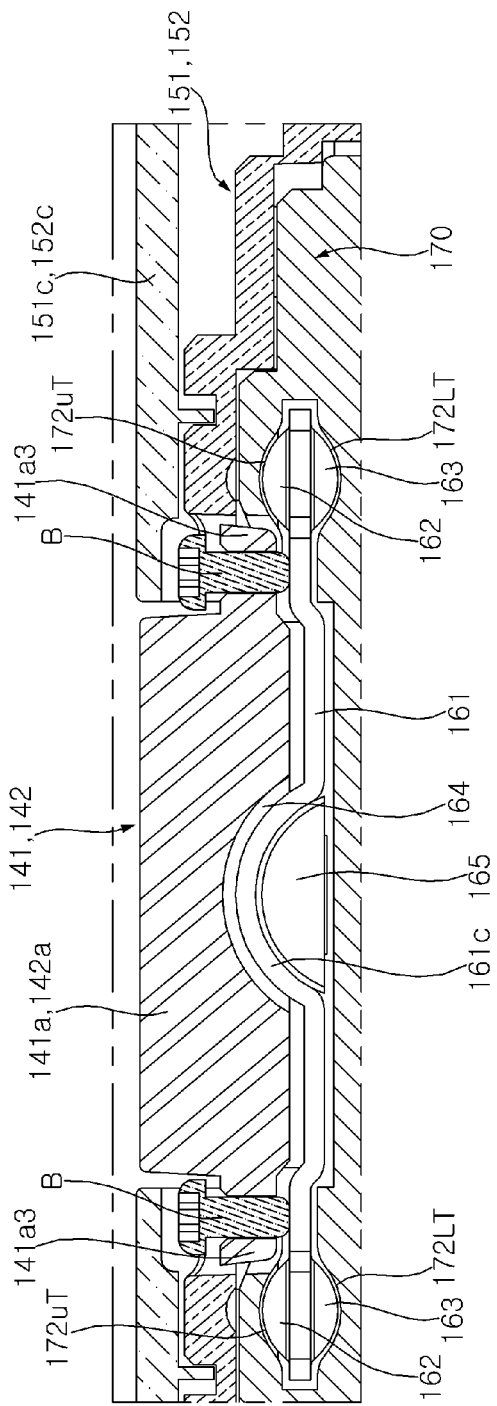

Referring to FIGS. 40 and 41, the slide bracket 160 may be inserted into the guide cover 170 and may move in the longitudinal direction of the wing 141, 142 in the guide cover 170. The guide cover 170 coupled with the slide bracket 160 may be coupled with the sliding mount 151, 152. The sliding mount 151, 152 may fix the guide cover 170 and/or the side bracket 160 to the rear surface of the plate 120 (see FIG. 2). A sliding mount cover 151c, 152c may cover the guide cover 170 and/or the sliding mount 160. The blade 141a, 142a of the wing 141, 142 may be movable on the sliding mount cover 151c, 152c.

The left-right level of the slide bracket 160 inserted into the guide cover 170 may be adjusted by the leveling bolt B. The leveling bolt B may set the limits of the left-right level of the slide bracket 160. Accordingly, it is possible to adjust a gap by which the slide bracket 160 seesaws around the upper supporter 165 inside the guide cover 170.

Accordingly, the slide bracket 160 may provide a buffer for the gap between components that occurs when the display device 100 is curved. In addition, a mechanism may be provided for the display panel 110 to be returned to a fully flat state after being curved.

Figure 42:
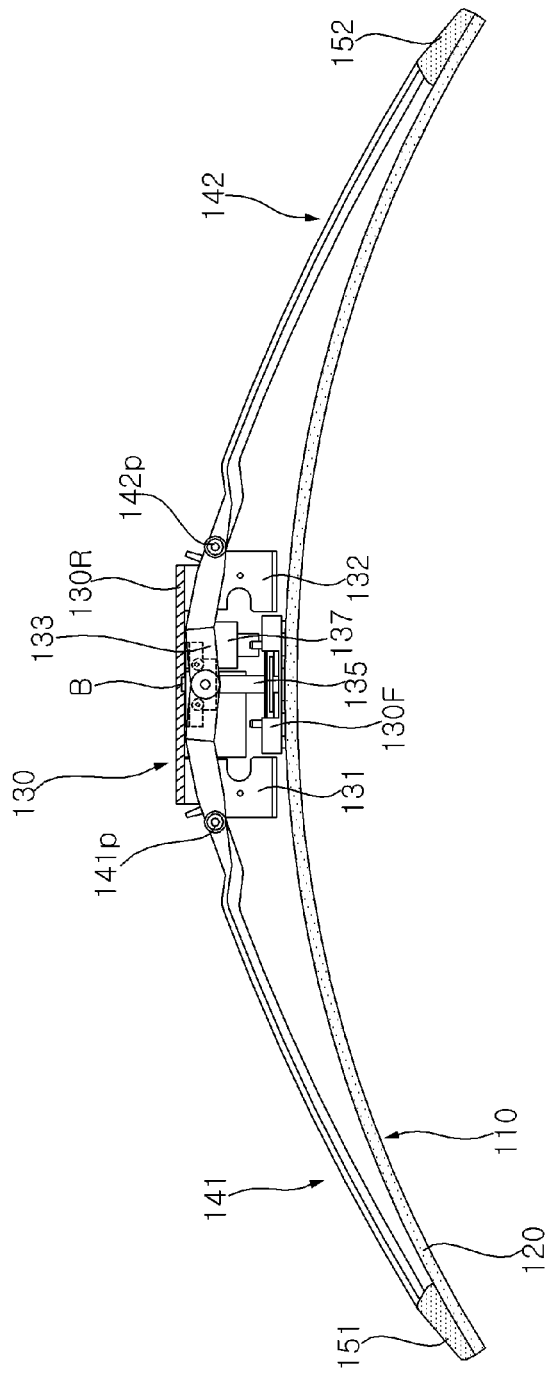

Referring to FIG. 42 together with FIG. 2, as the lead screw 135 is rotated by the rotational force provided by the motor 137, the flip frame 133 may be moved in the longitudinal direction of the lead screw 135 to pivot the wing 140 about the pivot shaft 141P, 142P.

When the wing 140 is pivoted, the slide bracket 160 may move in the sliding mount 151,152 (see FIG. 26) and the guide cover 170 and push both end sides of the display panel 110 and the plate 120 to curve the display panel 110.

When the lead screw 135 rotates in reverse, the flip frame 133 may move in the opposite direction of the lead screw 135 to pivot the wing 140 in the opposite direction about the pivot shaft 141P, 142P.

When the wing 140 pivots in the opposite direction, the slide bracket 160 may move in the sliding mount 151, 152 and the guide cover 170, and pull both end sides of the display panel 110 and plate 120 to flatten the display panel 110.

Referring to FIGS. 1 to 42, the display device includes: a flexible display panel; a flexible plate which is located in a rear side of the display panel, and to which the display panel is coupled; a drive module which is located in a rear side of the plate, and has a moving block that moves reciprocally on a lead screw; a sliding mount which is spaced apart from the drive module and coupled to the rear side of the plate; a slide bracket which is movably coupled to the sliding mount; a wing which extends long, has one end coupled to the moving block and the other end coupled to the slide bracket, and has a pivot shaft close to the moving block at between the moving block and the slide bracket; and a wing bracket which is connected to the pivot shaft, and fixed to the rear side of the plate, wherein the slide bracket is seesaw-connected to the wing.

The wing includes: a palm portion facing the slide bracket; and a recessed portion formed by recessing the palm portion in a half-pipe shape, wherein the slide bracket includes: a curved part bent in a shape corresponding to the recessed portion of the wing; and a fastening hole formed to penetrate the curved part, wherein the slide bracket is seesaw-connected to the recessed portion by a fastening member that penetrates the fastening hole and is fixed to the recessed portion.

The display device further includes a plate-shaped lower supporter which is located between the curved part of the slide bracket and the recessed portion of the wing, and corresponds to the recessed portion or the curved part, wherein the fastening member penetrates the lower supporter and is fixed to the recessed portion.

The display device further includes an upper supporter which faces the lower supporter with respect to the curved part of the slide bracket, and is fixed to the recessed portion by the fastening member.

The fastening hole formed in the curved part has a tapered edge facing the lower supporter.

The fastening hole formed in the curved part has a tapered edge facing the upper supporter.

The fastening hole is formed as a long hole, a distance of long axis of the fastening hole is larger than a diameter of the fastening member, and a distance of short axis of the fastening hole corresponds to the diameter of the fastening member.

The display device further includes: a leveling protrusion which is formed in one side of the wing, and overlaps the slide bracket; and a leveling bolt which is inserted into the leveling protrusion, and in contact with or spaced apart from the slide bracket.

The display device further includes a guide cover which is fixed to the sliding mount, and in which the slide bracket moves.

The slide bracket includes: a body having a center part overlapping the wing and a side part extending from one side of the center part; a front protrusion which is located in the side part of the body, and protrudes from one side of the body toward the plate, wherein the front protrusion is supported by the guide cover.

The display device further includes a rear protrusion which is located adjacent to the front protrusion, in the side part of the body, and protrudes from the other surface of the body in a direction opposite to the front protrusion, wherein the rear protrusion is supported by the guide cover.

The guide cover includes: a base facing the center part of the body of the slide bracket; and a side rail which is formed in one side of the base, and into which the side part of the body of the slide bracket is inserted, wherein the front protrusion and the rear protrusion move on the side rail.

The side rails includes: a lower part which extends from the base, and faces the side part of the body of the slide bracket; and an upper part opposite to the lower part with respect to the body of the slide bracket, wherein the front protrusion is supported by the lower part, and wherein the rear protrusion is supported by the upper part.

The lower part of the side rail includes a lower trench which is recessed into the inside of the lower part, and through which the front protrusion moves, wherein the upper part of the side rail includes an upper trench which is recessed into the inside of the upper part, and through which the rear protrusion moves.

The front protrusion is in point-contact with the lower trench, wherein the rear protrusion is in point-contact with the upper trench.

According to at least one embodiment of the present disclosure, it is possible to provide a structure that can freely change the curvature of a display panel.

According to at least one embodiment of the present disclosure, it is possible to provide a mechanism to freely change the curvature of a display.

According to at least one embodiment of the present disclosure, it is possible to provide an articulated structure for a mechanism that can freely change the curvature of a display panel.

According to at least one embodiment of the present disclosure, it is possible to improve the durability and noise of a display device capable of changing the curvature of a display panel.

According to at least one embodiment of the present disclosure, it is possible to provide a mechanism to change a display panel to a certain curvature and restore it to flat.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a flexible display panel;
a flexible plate at a rear of the display panel, the flexible plate coupled to the display panel;
a drive module at a rear of the plate, the drive module including a moving block that moves reciprocally on a lead screw;
a sliding mount spaced apart from the drive module and coupled to the rear of the plate;
a slide bracket movably coupled to the sliding mount;
a wing elongated, the wing including one end coupled to the moving block, the other end coupled to the slide bracket, and a pivot shaft closer to the moving block than the slide bracket between the moving block and the slide bracket; and
a wing bracket connected to the pivot shaft and fixed to the rear of the plate,
wherein the slide bracket is connected to the wing,
wherein the wing comprises:
a palm portion facing the slide bracket; and
a recessed portion depressed from the palm portion in a half-pipe shape,
wherein the slide bracket comprises:
a curved part bent in a shape corresponding to the recessed portion of the wing; and
a fastening hole penetrating the curved part,
wherein the slide bracket is connected to the recessed portion by a fastening member that penetrates the fastening hole and is fixed to the recessed portion, and
wherein the slide bracket is configured to seesaw to the recessed portion of the wing.

2. The display device of claim 1, further comprising a plate-shaped lower supporter which is located between the curved part of the slide bracket and the recessed portion of the wing, and corresponds to the recessed portion or the curved part,
wherein the fastening member penetrates the lower supporter and is fixed to the recessed portion.

3. The display device of claim 2, further comprising an upper supporter which is opposite to the lower supporter with respect to the curved part of the slide bracket, and is fixed to the recessed portion by the fastening member.

4. The display device of claim 2, wherein the fastening hole formed in the curved part includes a tapered edge facing the lower supporter.

5. The display device of claim 3, wherein the fastening hole formed in the curved part includes a tapered edge facing the upper supporter.

6. The display device of claim 1, wherein the fastening hole is formed as a long hole,
a distance of long axis of the fastening hole is larger than a diameter of the fastening member, and
a distance of short axis of the fastening hole corresponds to the diameter of the fastening member.

7. The display device of claim 1, further comprising:
a leveling protrusion which is formed in one side of the wing, and overlaps the slide bracket; and
a leveling bolt which is inserted into the leveling protrusion, and in contact with or spaced apart from the slide bracket.

8. The display device of claim 1, further comprising a guide cover which is fixed to the sliding mount, and in which the slide bracket is configured to move.

9. The display device of claim 8, wherein the slide bracket comprises:
a body having a center part overlapping the wing and a side part extending from one side of the center part; and
a front protrusion which is located in the side part of the body, and protrudes from one side of the body toward the plate,
wherein the front protrusion is supported by the guide cover.

10. The display device of claim 9, further comprising a rear protrusion which is located adjacent to the front protrusion, in the side part of the body, and protrudes from the other surface of the body opposite to the front protrusion,
wherein the rear protrusion is supported by the guide cover.

11. The display device of claim 10, wherein the guide cover comprises:
a base facing the center part of the body of the slide bracket; and
a side rail which is formed in one side of the base, and into which the side part of the body of the slide bracket is inserted,
wherein the front protrusion and the rear protrusion are configured to move on the side rail.

12. The display device of claim 11, wherein the side rail comprises:
a lower part which extends from the base, and faces the side part of the body of the slide bracket; and
an upper part opposite to the lower part with respect to the body of the slide bracket,
wherein the front protrusion is supported by the lower part, and
wherein the rear protrusion is supported by the upper part.

13. The display device of claim 12, wherein the lower part of the side rail comprises a lower trench which is recessed into the inside of the lower part, and through which the front protrusion is configured to move, and
wherein the upper part of the side rail comprises an upper trench which is recessed into the inside of the upper part, and through which the rear protrusion is configured to move.

14. The display device of claim 13, wherein the front protrusion is in point-contact with the lower trench, and
wherein the rear protrusion is in point-contact with the upper trench.

* * * * *